US007167360B2

(12) United States Patent
Inoue et al.

(10) Patent No.: US 7,167,360 B2
(45) Date of Patent: Jan. 23, 2007

(54) HARD DISK DRIVE HOUSING APPARATUS AND ELECTRONIC APPARATUS

(75) Inventors: Kenichi Inoue, Kanagawa (JP); Hitoshi Suzuki, Tokyo (JP); Kohtaroh Higuchi, Chiba (JP)

(73) Assignee: Sony Corporation (JP)

( * ) Notice: Subject to any disclaimer, the term of this patent is extended or adjusted under 35 U.S.C. 154(b) by 184 days.

(21) Appl. No.: 11/039,236

(22) Filed: Jan. 19, 2005

(65) Prior Publication Data

US 2005/0168929 A1    Aug. 4, 2005

(30) Foreign Application Priority Data

Feb. 3, 2004    (JP)    ............................ P2004-027214

(51) Int. Cl.
*G06F 1/16*    (2006.01)
*H02G 3/08*    (2006.01)
*B65D 81/02*    (2006.01)
*H05K 7/00*    (2006.01)

(52) U.S. Cl. ...................... 361/685; 248/632; 248/671; 360/97.01; 369/75.11; 174/544; 206/521; 206/701

(58) Field of Classification Search ................ 361/685; 360/97.01, 98.01, 137; 248/632–634, 636–638, 248/671; 369/75.11, 77.21, 80; 174/544, 174/52.1, 35 R, 52.4; 206/521, 701
See application file for complete search history.

(56) References Cited

U.S. PATENT DOCUMENTS

| 5,149,048 | A | * | 9/1992 | Morehouse et al. | ........ 248/632 |
| 5,405,000 | A | * | 4/1995 | Hagedon et al. | ............ 206/216 |
| 5,510,954 | A | * | 4/1996 | Wyler | ......................... 361/685 |
| 5,837,934 | A | * | 11/1998 | Valavanis et al. | ........... 174/544 |
| 6,154,360 | A | * | 11/2000 | Kaczeus et al. | ............ 361/685 |
| 6,324,054 | B1 | * | 11/2001 | Chee et al. | ................. 361/685 |
| 6,619,481 | B1 | * | 9/2003 | Merrell et al. | .............. 206/721 |
| 2005/0168935 | A1 | * | 8/2005 | Inoue et al. | ................. 361/685 |

* cited by examiner

*Primary Examiner*—Lisa Lea-Edmonds
(74) *Attorney, Agent, or Firm*—Lerner, David, Littenberg, Krumholz & Mentlik, LLP

(57) ABSTRACT

In a hard disk drive (HDD) or an electronic apparatus in which the HDD is wrapped with a foam resin sheet with a noise absorption effect and a metal outer casing to thereby damp noise, a sub-assembly wrapping body incorporating therein the HDD wrapped with a wrapping body composed of a slippery film sheet with foam resin sheets attached thereto is mounted into the metal outer casing through the slippery surface of the slippery film sheet. In order to insulate a noise generated from a recording and reproducing drive apparatus such as the HDD, the system for use with the HDD and the electronic apparatus can simplify the assembly process required when the HDD is loaded into the outer casing serving as a noise insulation box through a noise absorption member.

7 Claims, 17 Drawing Sheets

HARD DISK DRIVE HOUSING APPARATUS AND ELECTRONIC APPARATUS

BACKGROUND OF THE INVENTION

1. Field of the Invention

The present invention relates generally to a hard disk drive housing apparatus and an electronic apparatus, and particularly to a hard disk drive (HDD) housing apparatus and an electronic apparatus in which heat generated from a hard disk drive housing apparatus and an electronic apparatus can be radiated, a noise and a vibration from the hard disk drive housing apparatus and the electronic apparatus can be absorbed and in which a package body in which the hard disk drive housing apparatus is wrapped with a vibration absorption material for insulating a noise can be easily inserted into a noise insulation box.

2. Description of the Related Art

A known case main body for accommodating therein a drive unit rotating at high speed within a hard disk drive (HDD) has had airtight property in order to prevent a noise generated when the drive unit is rotated and vibrated. From a heat radiation standpoint, such airtight case main body encounters with problems in which the above airtight case main body has no convection of air, it accumulates heat and it cannot maintain sufficient heat radiation effect. To solve the above-mentioned problems, cited patent reference 1 has disclosed a HDD housing structure in which two problems of heat radiation and absorption of vibration can be solved effectively while airtight property can be maintained.

FIG. 1 of the accompanying drawings is a schematic perspective view showing a HDD housing structure disclosed in the cited patent reference 1.

As shown in FIG. 1, the above-described cited patent reference 1 discloses a housing structure for housing a HDD 7 in which a hard disk drive unit and the like are housed within a flat case 1 of which outward appearance is substantially a rectangular solid and in which noise absorption members 4a, 4b, 4c and 4d are provided within the case 1. As shown in FIG. 1, the case 1 is composed of a case lid 2 and a box-like case main body 3 with the case 2 mounted to an open bottom portion thereof. Noise absorption members 4a, 4b, 4c and 4d, each of which has a predetermined thickness, are disposed along the inner wall portion around the case main body 3. A heat radiation plate 5 is located on the inside of the top portion 3a of the case main body 3 and a drive unit is located between supporting members 6L and 6R erected from the heat radiation plate 5 to the inside of the case main body 3. In order to enable the heat radiation plate 5, the supporting members 6L, 6R and the case lid 2 to form a heat radiation structure which contacts with the drive unit to radiate heat from the drive unit, the case lid 2, the case main body 3, the heat radiation plate 5 and the supporting members 6L, 6R are made of aluminum or aluminum alloy.

According to this arrangement, the noise absorption members 4a, 4b, 4c and 4d can absorb a vibration noise and they can also decrease leakage of a noise to the outside. In addition, the case lid 2, the case main body 3, the heat radiation plate 5 and the supporting members 6L, 6R are made of material having excellent heat conduction property and hence heat radiation effect of the drive unit can be exhibited.

As shown in FIG. 1, the noise absorption members 4a, 4b, 4c and 4d are made of a sponge-like soft synthetic resin or a natural rubber and a part of the noise absorption members 4a, 4b, 4c and 4d can kept its position in the state in which it is held between the inner wall surface of the case main body 3 and the supporting members 6L, 6R. Also, the heat radiation plate 5 is attached to the inner surface of the case lid 2 through a member high heat transmission property and cushion property, for example, a square plate member 8 made of an adhesive synthetic resin commercially available under trade name of "SORBOTHANE" and this heat radiation plate 5 is brought in contact with the drive unit of the HDD 7. A second heat radiation plate 5a is provided between the case lid 2 and the heat radiation plate 5 and it is brought in contact with the case lid 2 through the second square member 8a and the noise absorption member 4d. Accordingly, heat is transmitted from the heat radiation plate 5a to the case lid 2 by the second square plate member 8a with the high heat transmission property and the cushion property.

Further, a cited patent reference 2 has disclosed a structure to completely house a hard disk (HD) into a box made of a noise absorption material as an attachment structure in which a noise generated from the HDD 7 can be decreased and in which heat radiation efficiency can be improved.

FIG. 2 is an exploded perspective view showing the HDD 7 disclosed as an example of the related art in the cited patent reference 2. According to this noise dumping structure, as shown in FIG. 2, a base 10 and a cover 11 are attached so as to sandwich the HDD 7. The HDD 7 is fixed to the base 10 by screws 12a and a vibration isolation member 13 is disposed between the base 10 and the HDD 7. The cover 11 is fixed to the base 10 by the screws 12a across the HDD 7 in an opposing relation to the base 10. The cover 11 is provided with a cooling fan (exclusive fan) 14 fixed thereto by screws 12c. A noise absorption member 4 attached to the cover 11 is provided between the cover 11 and the HDD 7. In this manner, the HDD 7 is accommodated into the noise insulation box composed of the base 10 and the cover 11.

More specifically, according to the arrangement shown in FIG. 2, the exclusive cooling fan 14 attached to the HDD 7 forces the inside of the noise insulation box to be air-cooled in a forcedly air-cooled fashion to efficiently radiate heat generated from the HDD and hence function of the hard disk can be maintained highly reliable.

According to the arrangement of the HDD 7 described in the above-mentioned cited patent reference 1, since the noise absorption members 4a to 4d and the two heat radiation plates 3, 3a are incorporated within the case main body 3 and the case lid 2 comprising the case 1, the case 1 of the HDD 7 becomes large in size. In addition, since the noise absorption members 4a, 4b, 4c and 4d are attached to the inside of the case main body 3, the assembly process becomes complex and the assembly requires a large number of assembly processes.

Also, according to the arrangement of the HDD 7 described in the above-mentioned cited patent reference 2, from a noise insulation standpoint, the HDD 7 needs the exclusive cooling fan 14 and a noise is unavoidably generated from this exclusive cooling fan 14.

The cited patent reference 2 described that, when a noise generated from the exclusive cooling fan 14 and a noise generated from the HDD 7 are compared with each other, a noise generated from the exclusive cooling fan 14 is negligibly as small as about 20 dB and it is too small to exert a bad influence upon the noise insulation structure while a noise from the HDD 7 is about 35 dB. However, a vibration and a noise generated from the exclusive cooling fan 14 cannot be completely neglected.

Further, since the exclusive cooling fan 14 is located near the cover 11 comprising the enclosure of the HDD 7, a pickup head within the HDD 7 is shocked by a vibration from the exclusive cooling fan 14 and the hard disk and the drive motor, etc. are shocked by a vibration from the exclusive cooling fan 14 so that the pickup head, the hard disk, etc. will be broken.

[Cited patent reference 1]: Official gazette of Japanese laid-open patent application No. 2002-74929

[Cited patent reference 2]: Official gazette of Japanese laid-open patent application No. 11-66832

SUMMARY OF THE INVENTION

In view of the aforesaid aspect, it is an object of the present invention to provide a hard disk drive (HDD) and an electronic apparatus in which an inner casing comprising the HDD is wrapped with a wrapping body made of a thin film sheet having a foam resin sheet having noise insulation effect and shock-absorbing effect, such as a noise absorption member or a noise-proof member attached thereon, and the HDD wrapped with this wrapping body is inserted into an outer casing serving a noise insulation box so that the noise absorption member or the noise-proof member can be inserted into and removed from the noise insulation box with ease by lesser assembly process.

It is another object of the present invention to provide an HDD and an electronic apparatus in which a wrapping body with a foam resin sheet or the like attached thereon is mounted on an outer casing through a thin film sheet so that heat generated from the HDD can be radiated efficiently and that a seek noise generated when a pickup head within the HDD frequently seeks a target track can be decreased by the foam resin sheet and the thin film sheet.

According to an aspect of the present invention, there is provided a hard disk drive housing apparatus which is comprised of a hard disk drive housing device formed of substantially a square inner casing for housing therein a hard disk drive, a thin film sheet cut with a size large enough to wrap the substantially square inner casing of the hard disk drive housing device, a wrapping body in which a noise insulation member or a noise absorption member is attached to the thin film sheet and an outer casing formed as a substantially a box-like shape into which the hard disk drive housing device wrapped with the wrapping body is inserted, wherein the thin film sheet surface comes in contact with the inner surface of the box-shaped outer casing in the state in which the hard disk drive housing device is wrapped with the wrapping body.

According to another aspect of the present invention, there is provided an electronic apparatus including a hard disk drive housing apparatus formed of a substantially square inner casing incorporating therein a hard disk drive. This electronic apparatus is comprised of a thin film sheet cut with a size large enough to wrap the substantially square inner casing of the hard disk drive housing apparatus, a wrapping body in which a noise insulation member of a noise absorption member is attached to the thin film sheet, an outer casing shaped like a substantially box-shape for mounting thereon the hard disk drive housing apparatus wrapped with the wrapping body, a chassis for holding the outer casing with a shock-absorbing member, wherein a noise generated from the hard disk drive incorporated into the inner casing of the hard disk drive housing apparatus can be insulated by mounting the hard disk drive housing apparatus on the electronic apparatus in such a manner that the thin film sheet surface is brought in contact with the inner surface of the box-like outer casing in the state in which the hard disk drive housing apparatus is wrapped with the wrapping body.

According to the above-mentioned HDD and electronic apparatus of the present invention, since the HDD is wrapped with the wrapping body made of the film sheet with the noise insulation member or the noise absorption member attached thereto and inserted into the noise insulation box (outer casing), there can be obtained the HDD and the electronic apparatus in which the wrapping body can be easily inserted into the noise insulation box owing to slippage of the film sheet and in which, since the film sheet has the pull-out member formed thereon, the wrapping body can be easily pulled out of the noise insulation box by pulling out this pull-out member.

Further, according to the HDD and the electronic apparatus of the present invention, since the HDD is wrapped with the wrapping body formed of the film sheet with the noise insulation member and the noise absorption member attached thereto, there can be obtained the HDD and the electronic apparatus in which heat generated from the HDD can be radiated efficiently, in which seek noise generated when the pickup head within the HDD frequently seeks a target track can be decreased by the film sheet, the noise insulation member and the noise absorption member and in which reliability of hard disk function can be maintained.

DESCRIPTION OF THE PREFERRED EMBODIMENTS

A hard disk drive (HDD) and an electronic apparatus according to an embodiment of the present invention will hereinafter be described with reference to FIGS. 3 to 15 on the basis of a recorder including a plurality of recording and reproducing drive units, by way of example.

Figure 1:
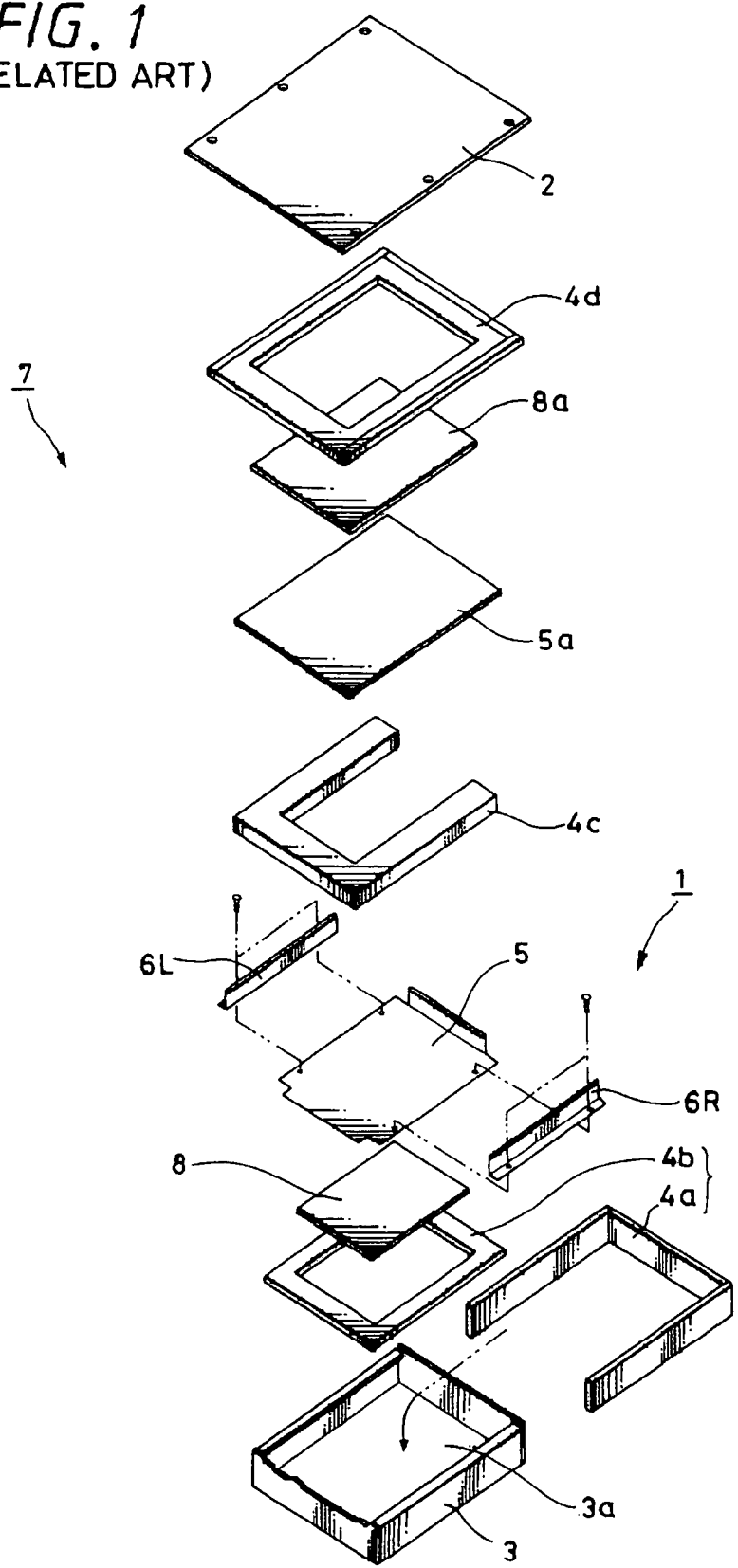
FIG. 1 is a perspective view showing a hard disk drive (HDD) and to which reference will be made in explaining a noise insulation unit according to the related art.
Figure 2:
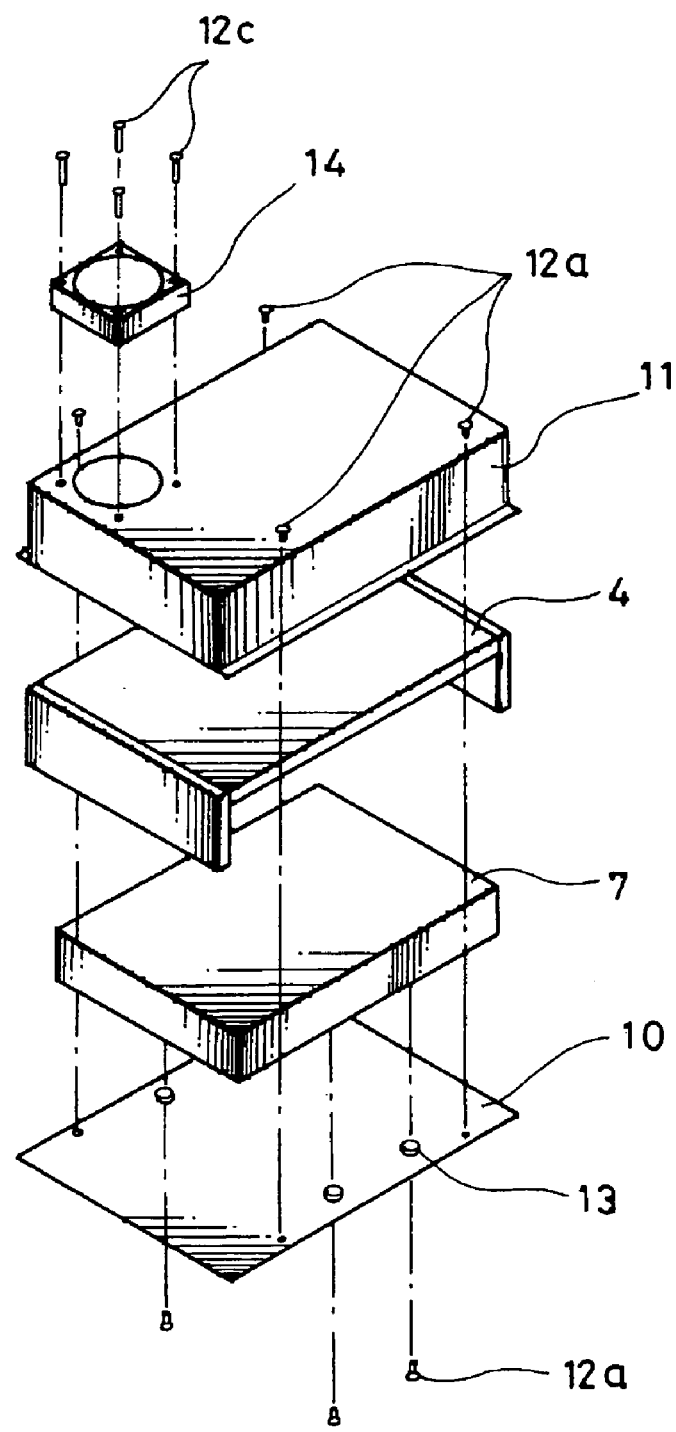
FIG. 2 is an exploded perspective view showing an arrangement of a HDD and to which reference will be made in explaining a noise insulation unit according to the related art.
Figure 3:
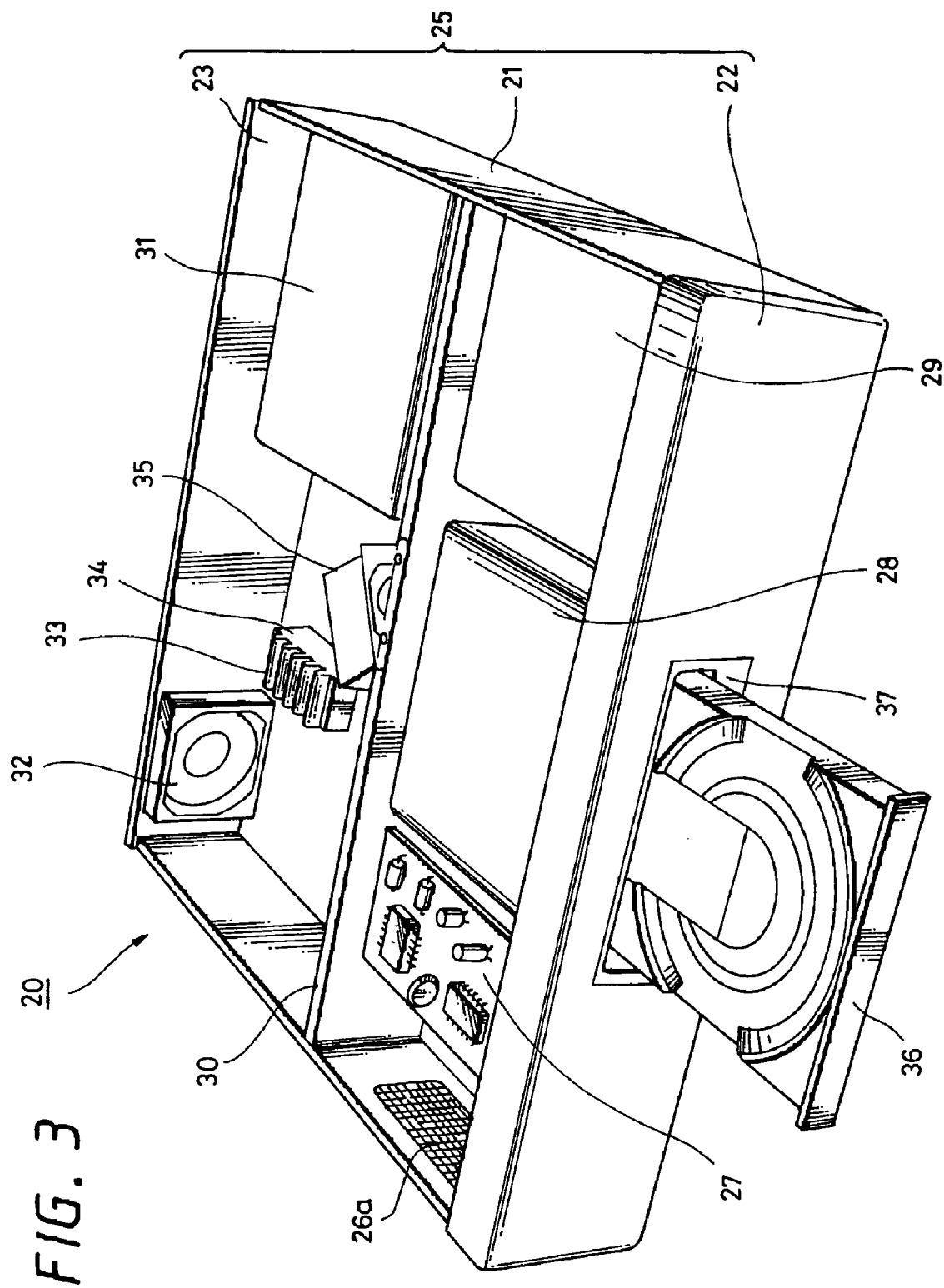
FIG. 3 is a perspective view showing an overall arrangement of a recorder according to an embodiment of the present invention with its cover being removed.
Figure 4:
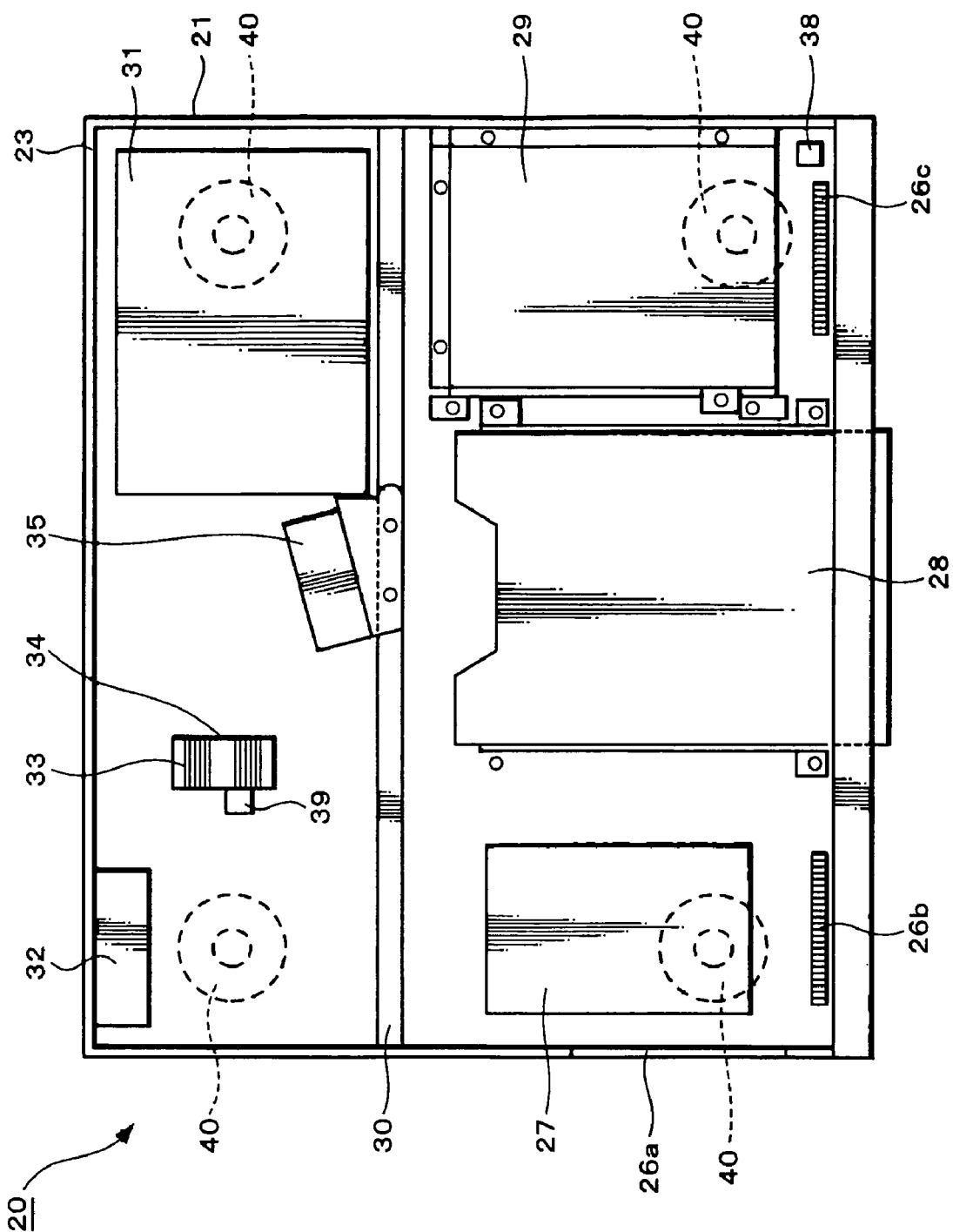
FIG. 4 is a plan view showing a chassis of the recorder shown in FIG. 3.
Figure 5:
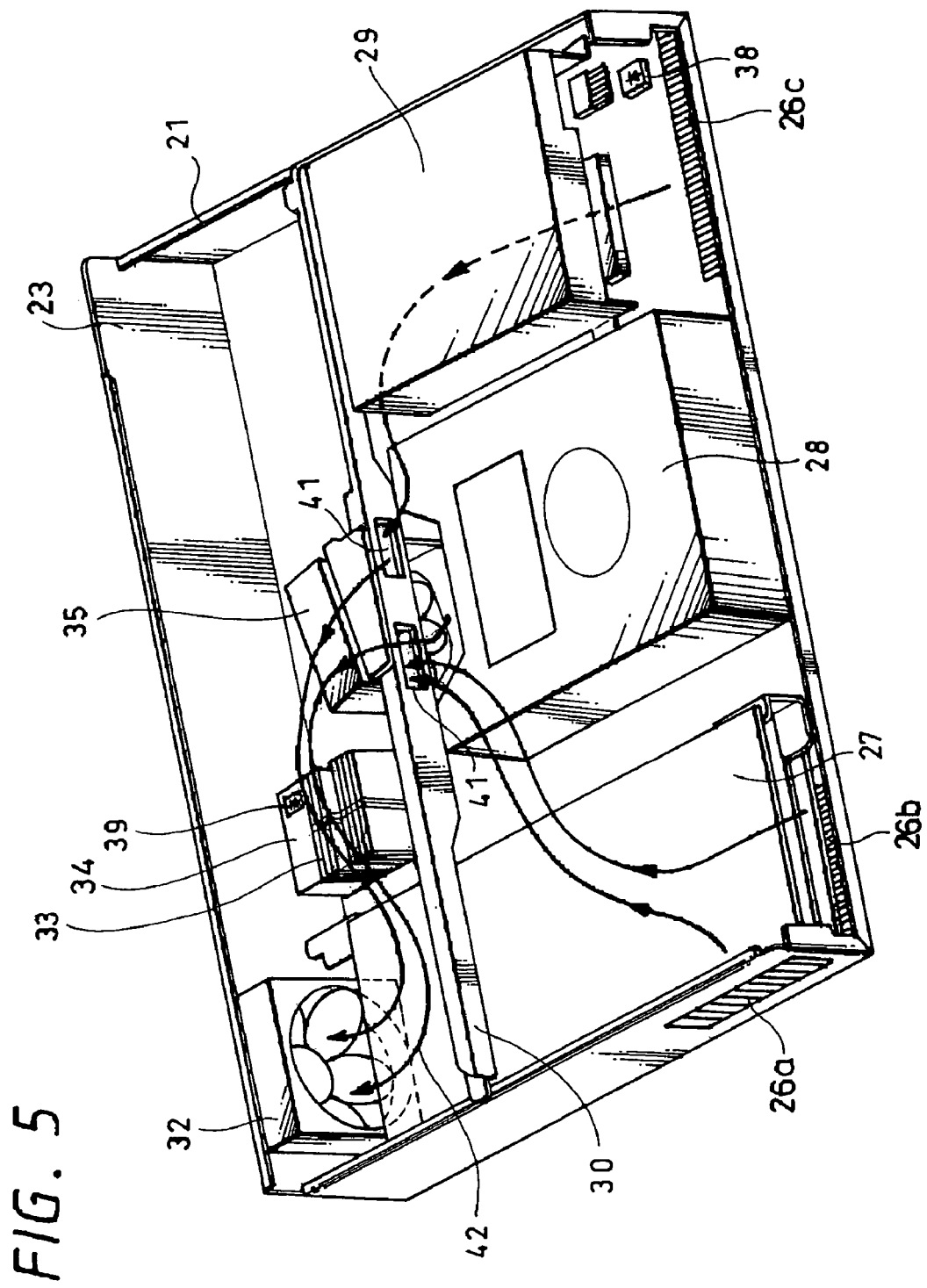
FIG. 5 is a perspective view showing the chassis of the recorder according to the present invention and to which reference will be made in explaining the state in which an air current is disturbed by cooling fans.
Figure 6:
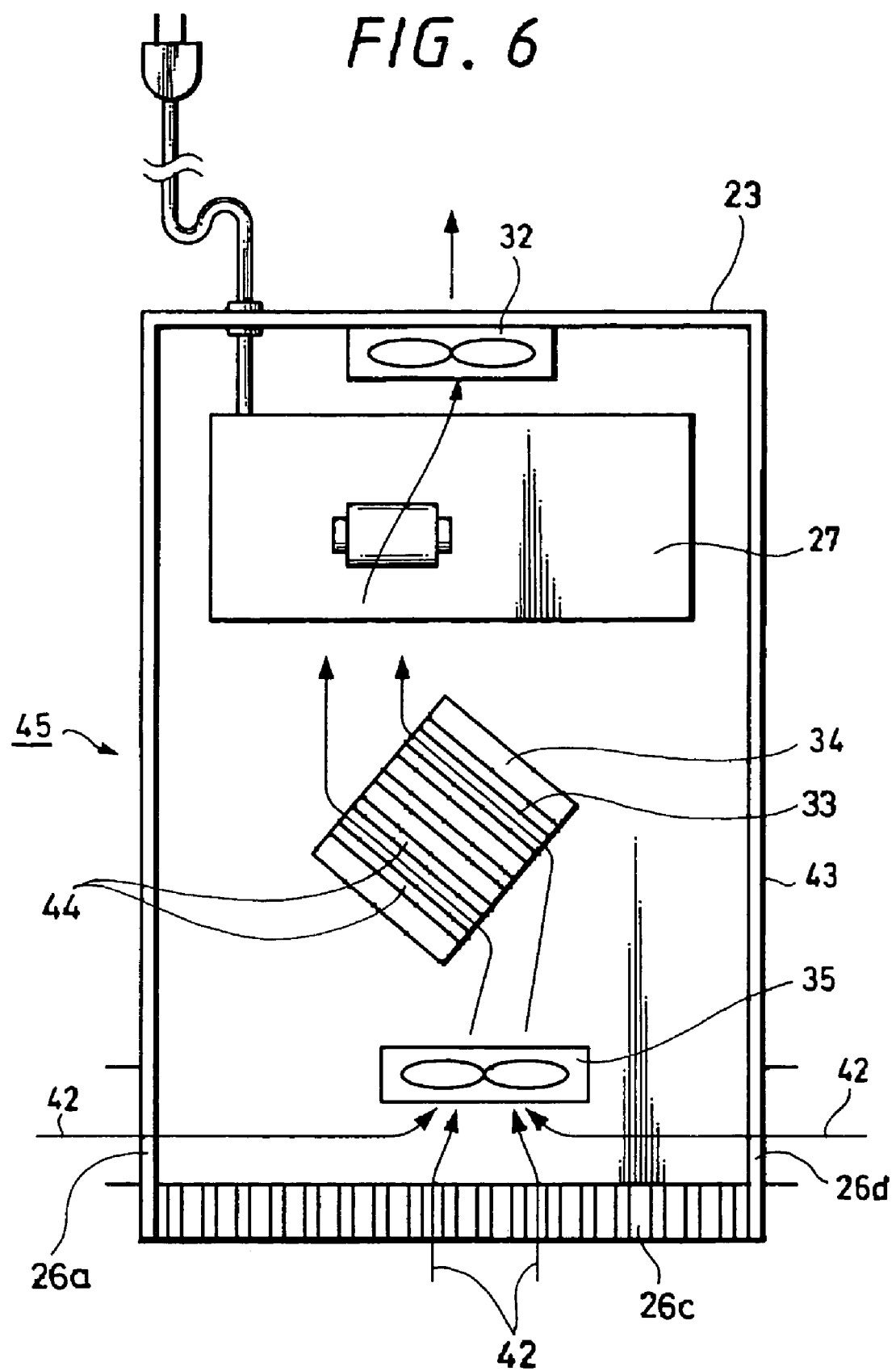
FIG. 6 is a plan view of the HDD for use with the recorder according to the present invention and to which reference will be made in explaining the layout of the cooling fans.
Figure 7:
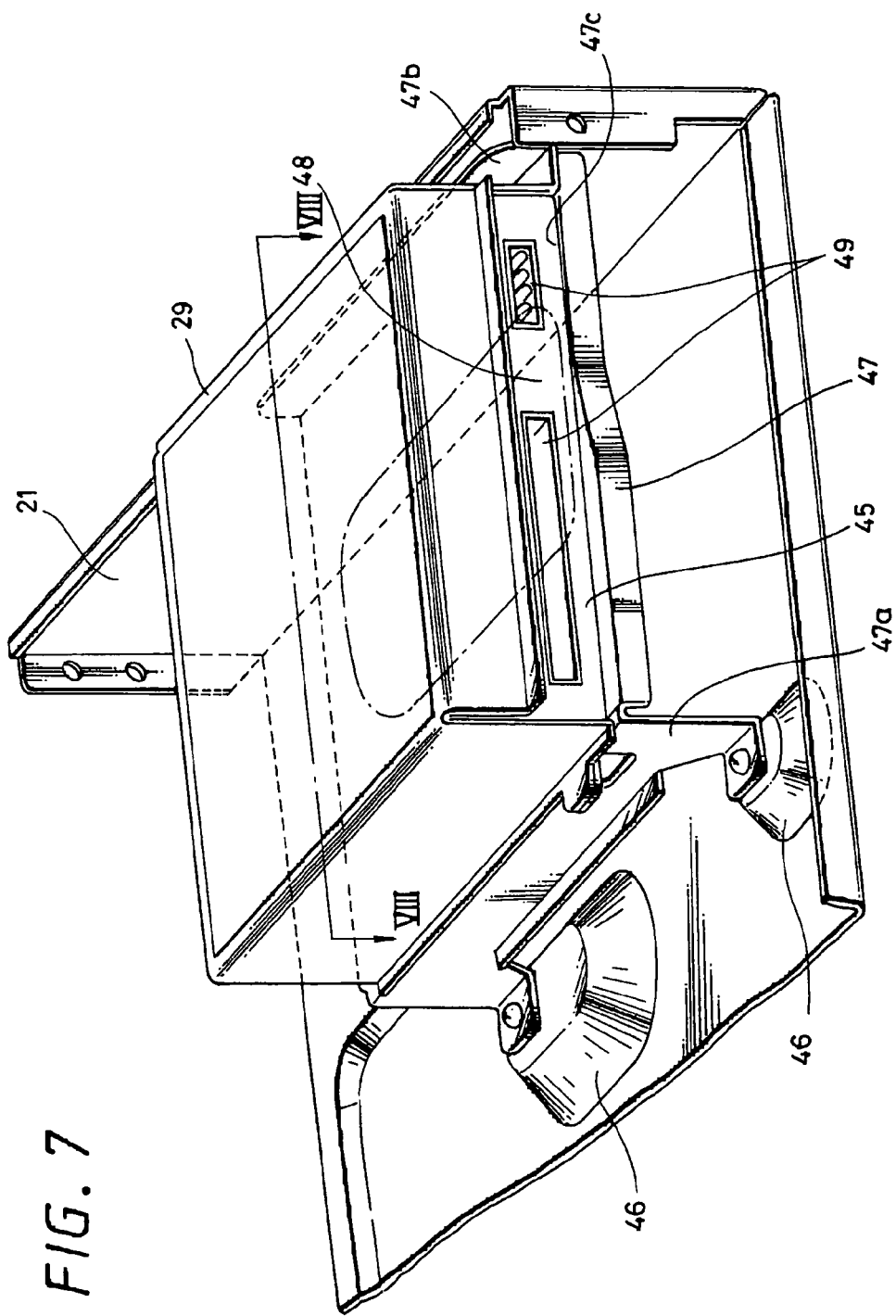
FIG. 7 is a perspective view of an outward appearance showing the attached state of a HDD drive unit for use with the recorder according to the present invention.
Figure 8:
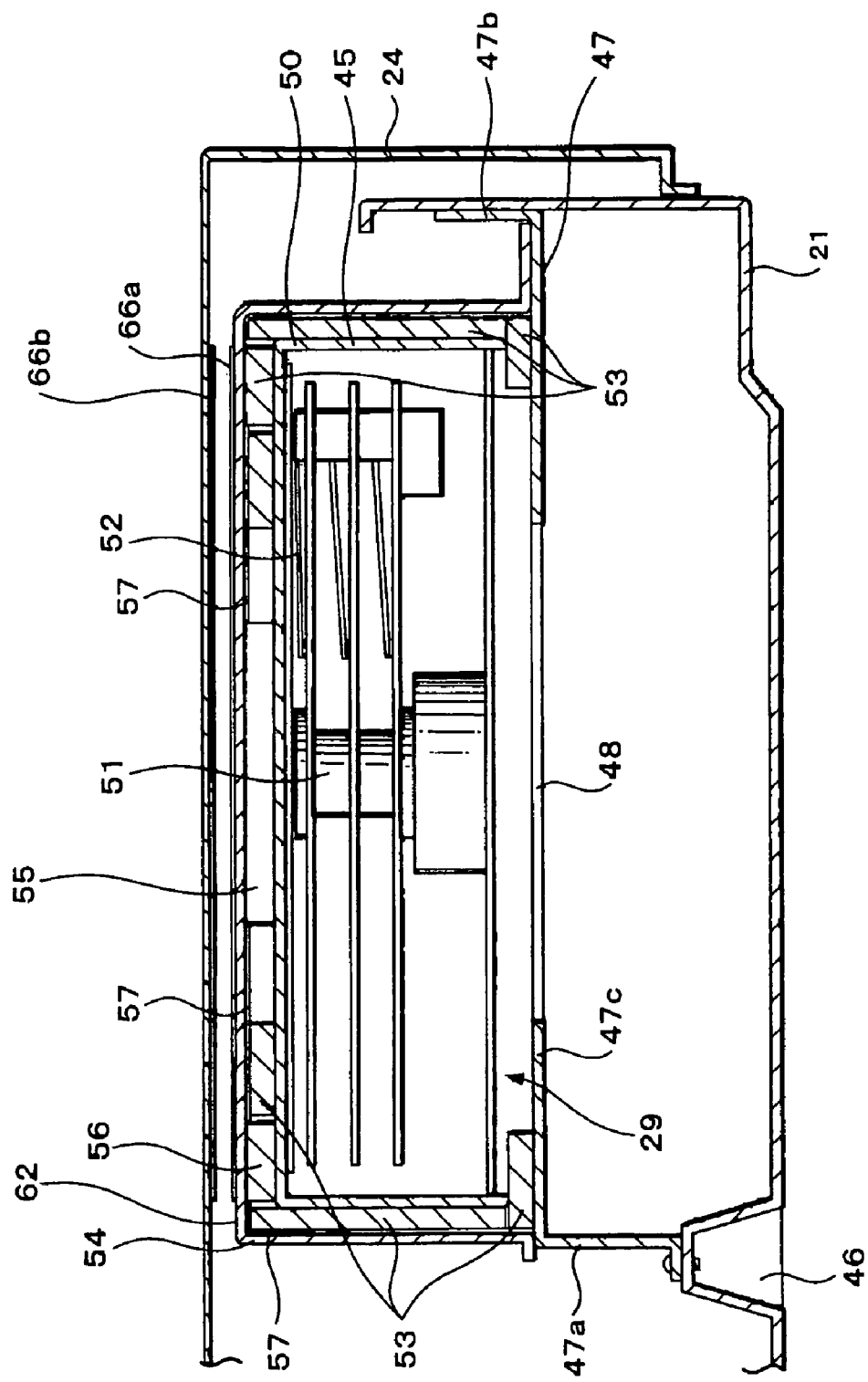
FIG. 8 is a cross-sectional view taken along the line VIII—VIII in FIG. 7 and to which reference will be made in explaining a heating method in the HDD for use with the recorder according to the present invention.
Figure 9:
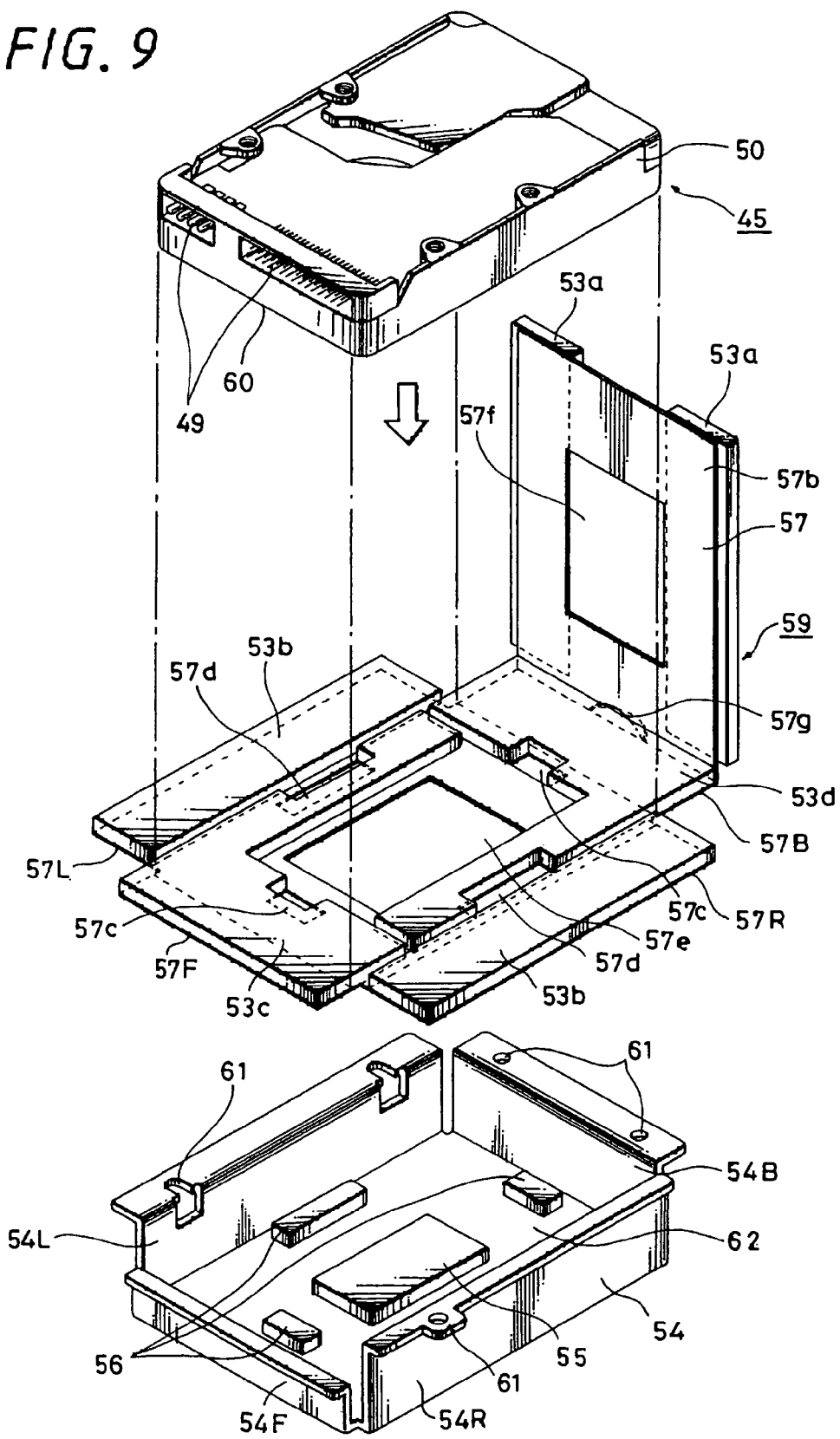
FIG. 9 is an exploded perspective view showing the state in which the HDD for use with the recorder according to the present invention is attached to an outer casing.
Figure 10:
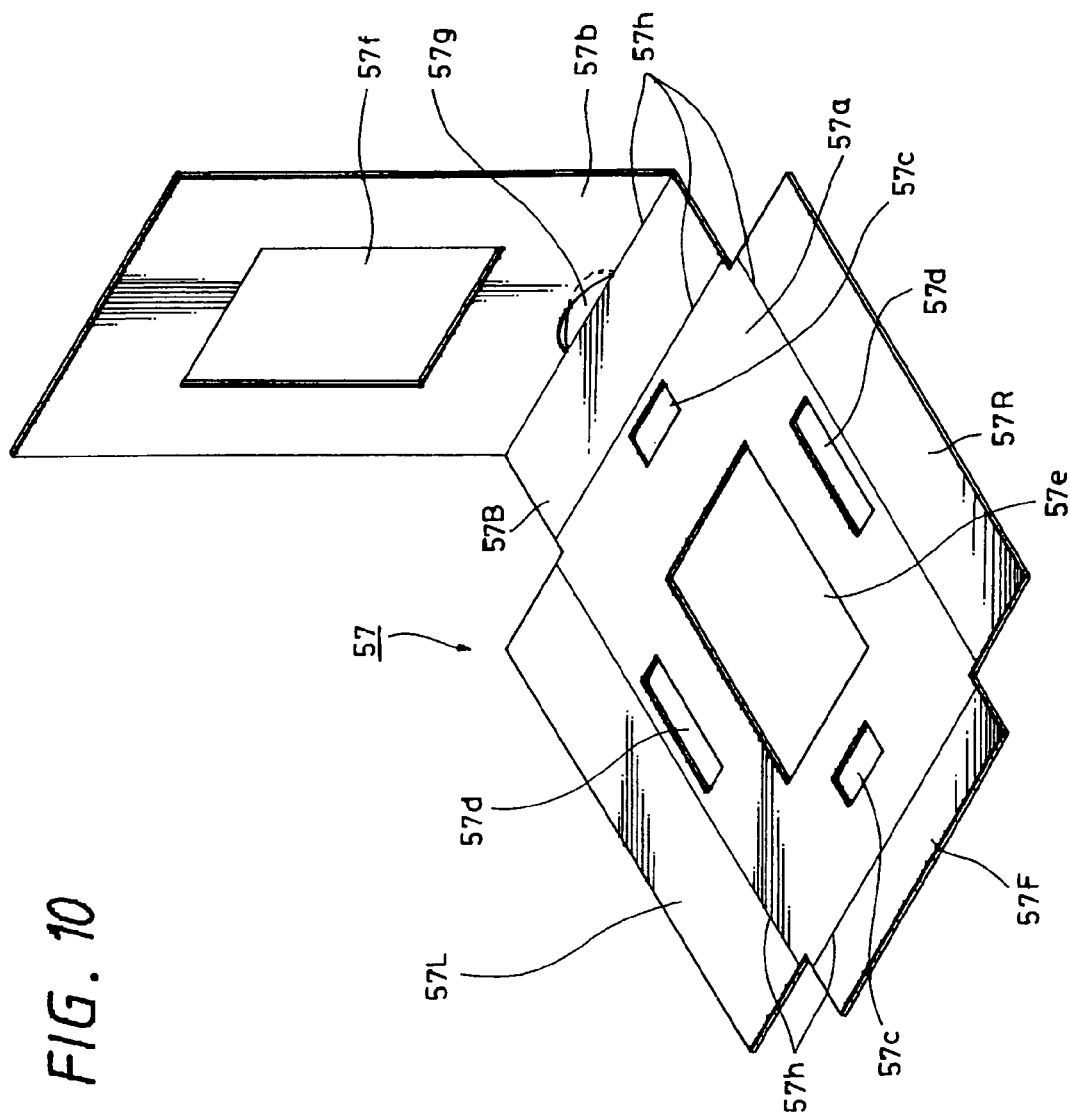
FIG. 10 is a perspective view showing a film sheet for use with the recorder according to the present invention.
Figure 11:
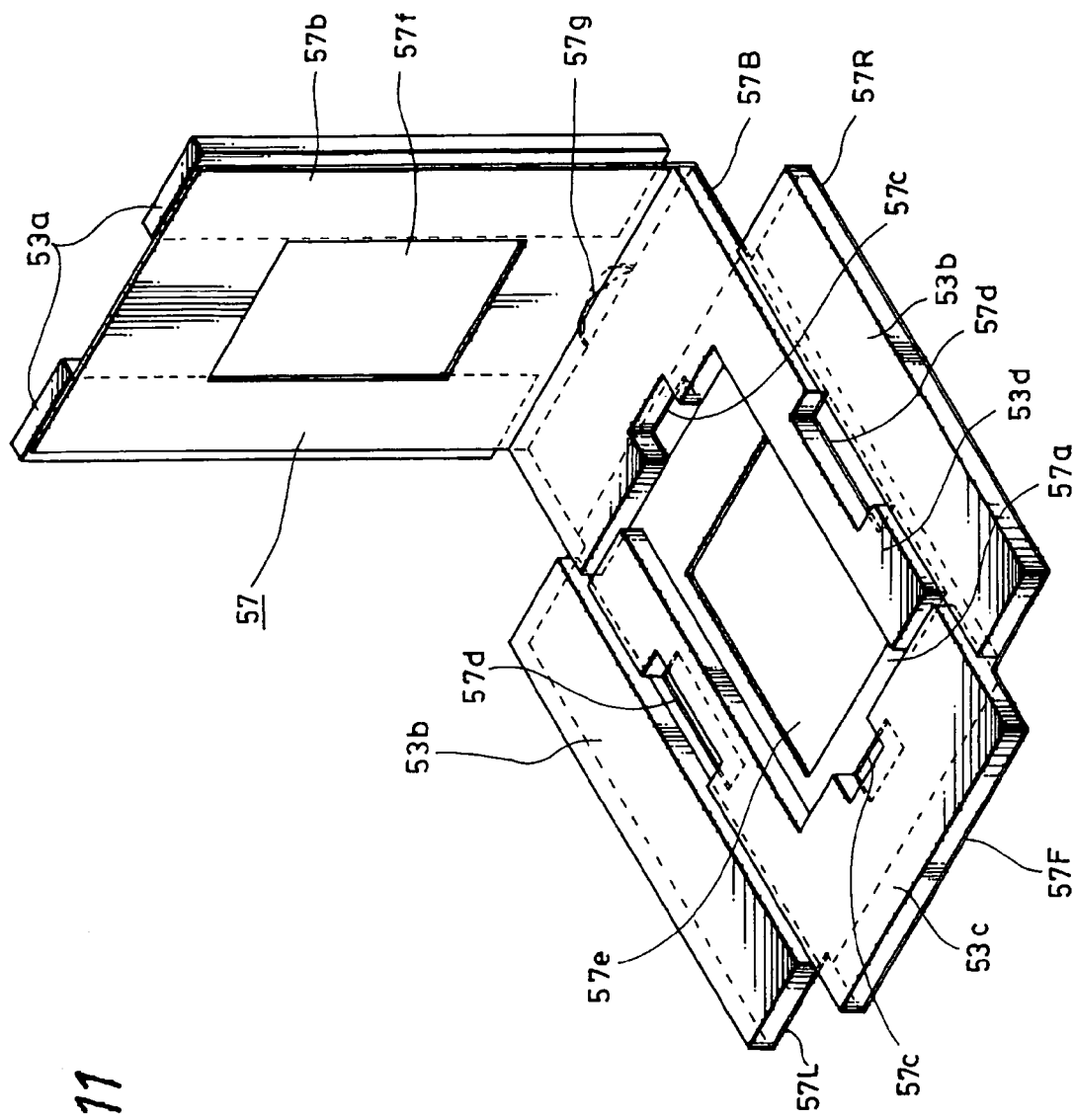
FIG. 11 is a perspective view showing the state in which an elastic member and an earth ground member are attached to the film sheet of FIG. 10.
Figure 12A:
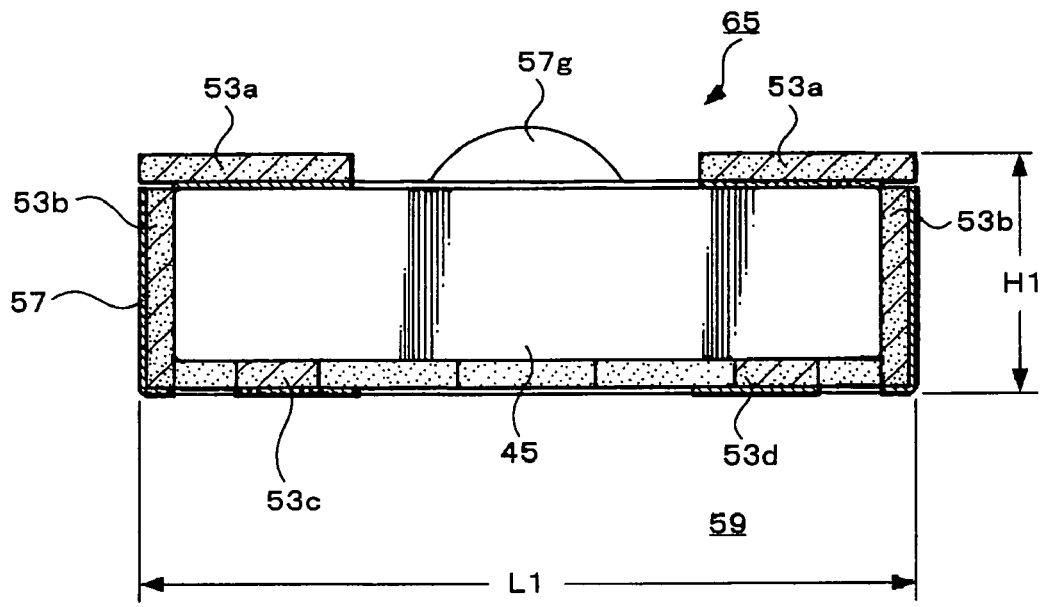
FIGS. 12A and 12B are schematic diagrams showing the state in which the HDD is assembled on the outer casing for use with the recorder according to the present invention, respectively.
Figure 12B:
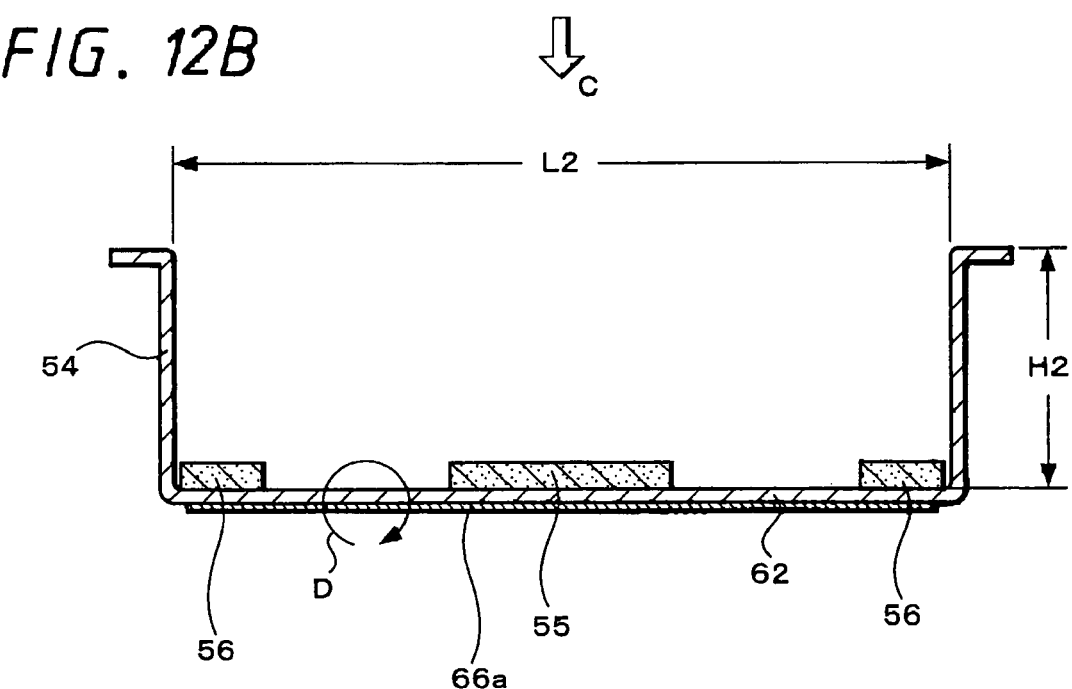
Figure 12C:
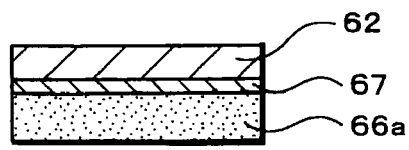
FIG. 12C is a schematic diagram showing a portion D in FIG. 12B in an enlarged-scale.
Figure 13A:
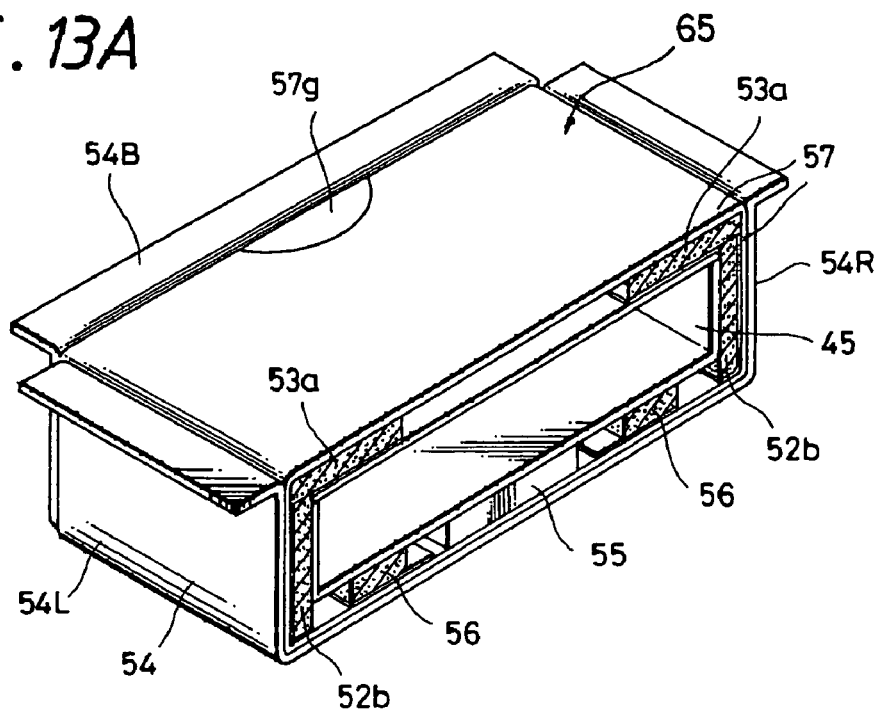
FIGS. 13A and 13B are perspective views used to explain a pull-out member to pull out the HDD from the outer casing of the recorder according to the present invention, respectively.
Figure 13B:
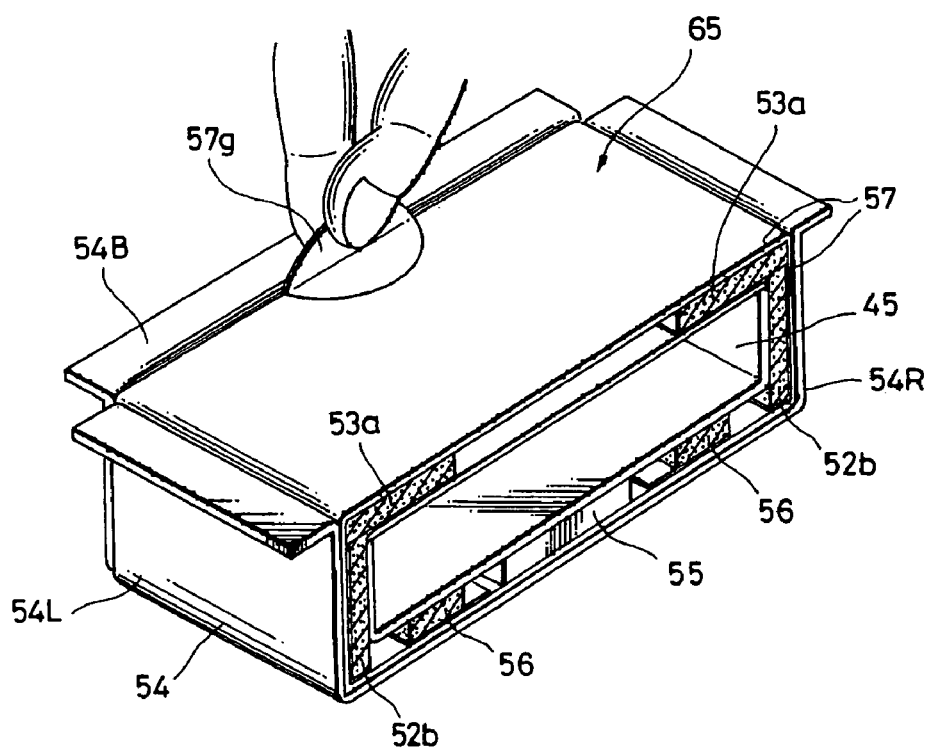
Figure 14:
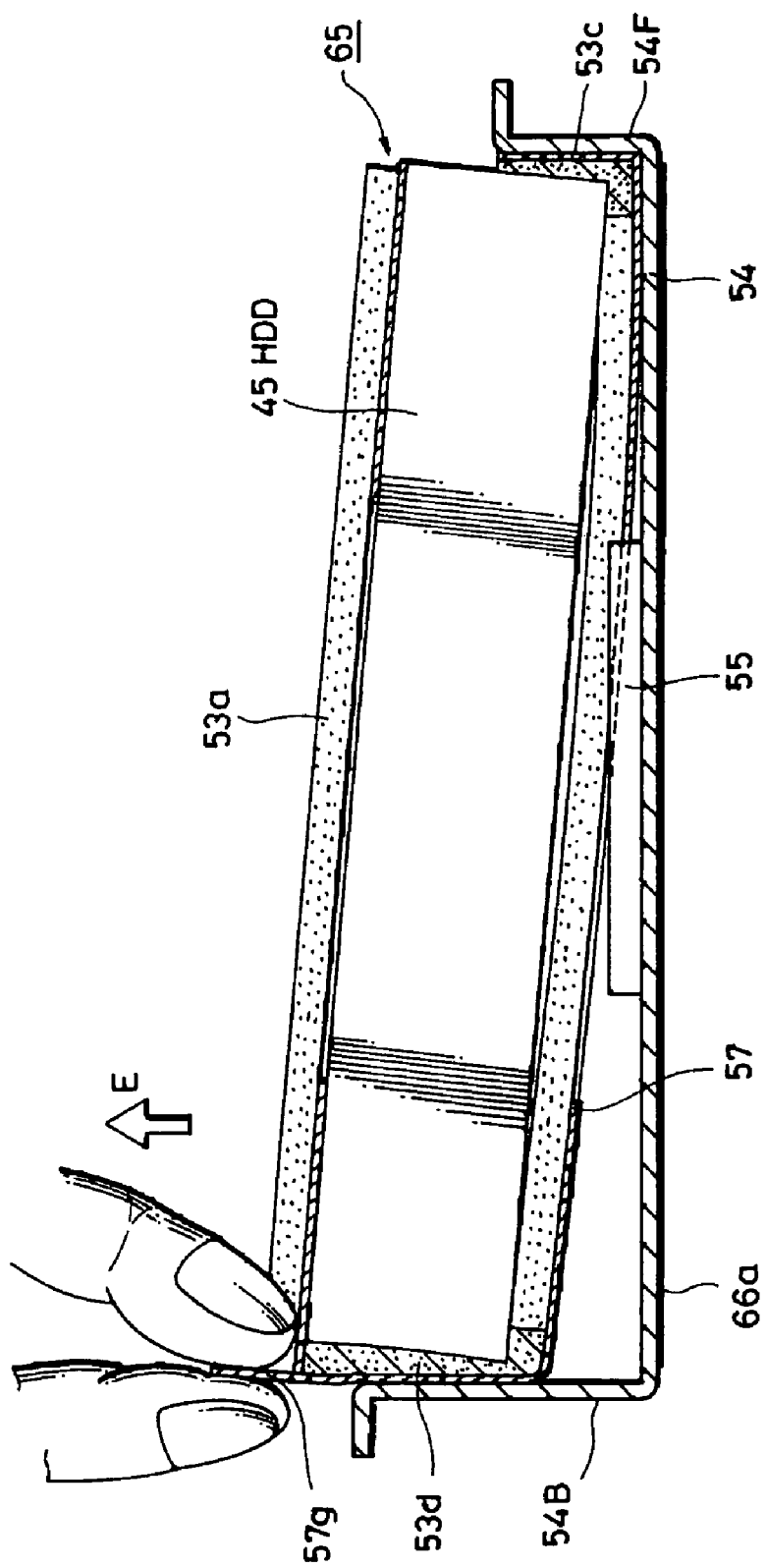
FIG. 14 is a schematic cross-sectional side view used to explain the state in which the HDD is pulled out of the outer casing of the recorder according to the present invention.
Figure 15:
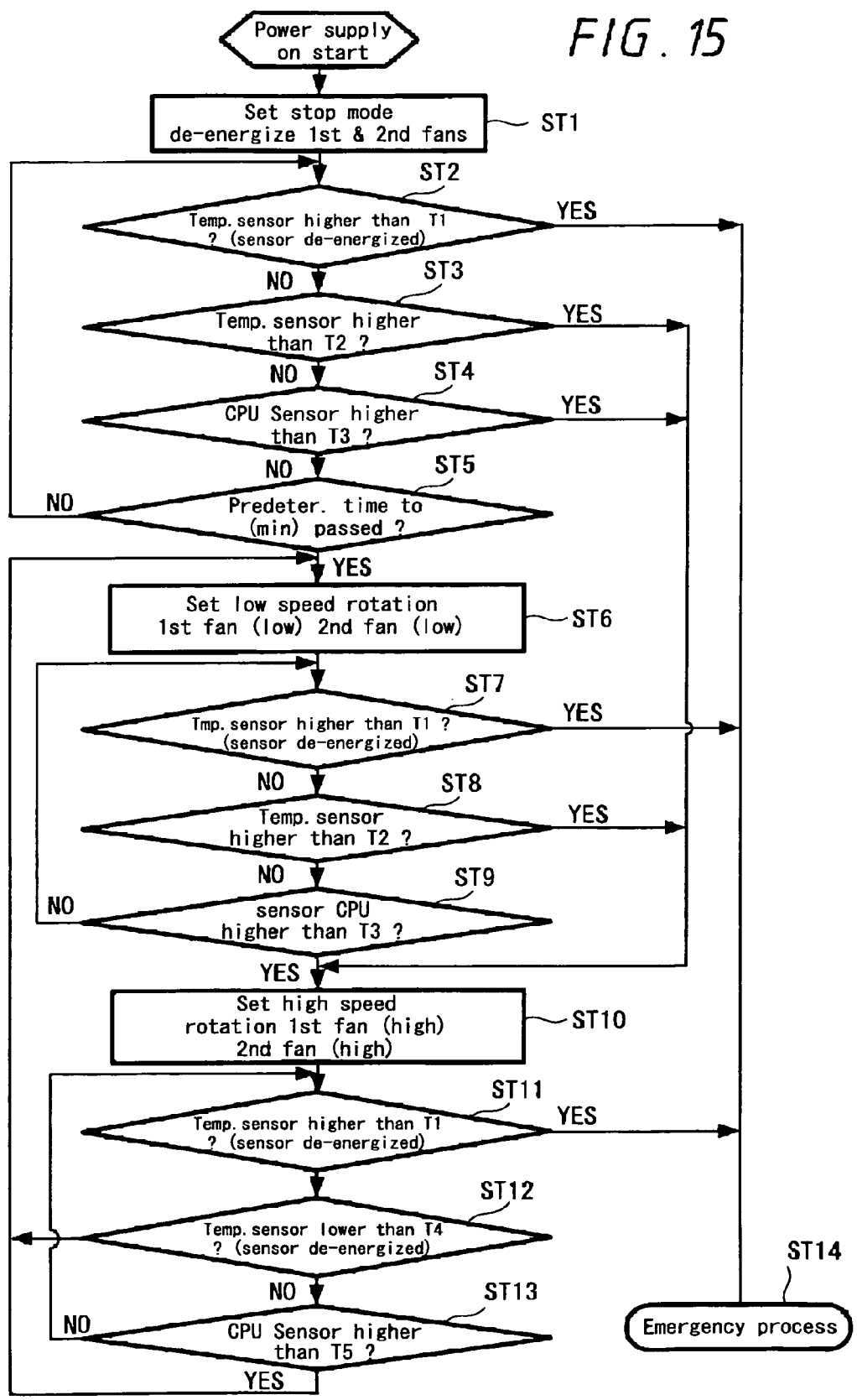
FIG. 15 is a flowchart to which reference will be made in explaining a method for controlling a plurality of cooling fans according to the present invention.

FIG. 3 is a perspective view showing an overall arrangement of a recorder according to the present invention with its cover being removed; FIG. 4 is a plan view showing a chassis of the recorder; FIG. 5 is a perspective view of the chassis of the recorder and to which reference will be made in explaining the state in which air is sent by ventilators; FIG. 6 is a schematic plan view used to explain the state in which air is sent by ventilators; FIG. 7 is a perspective view used to explain the state in which a HDD is attached to a HDD drive unit of the recorder: FIG. 8 is a cross-sectional view taken along the line VIII-VIII in FIG. 7; FIG. 9 is an exploded perspective view showing the state in which the HDD is attached to the outer casing; FIG. 10 is a perspective view showing a film sheet; FIG. 11 is a perspective view showing the state in which an elastic member and an earth ground member are attached to the film sheet; FIGS. 12A, 12B and 12C are schematic diagrams used to explain the state in which the HDD is assembled to the outer casing, respectively; FIGS. 13A, 13B and FIG. 14 are schematic perspective views and a schematic cross-sectional side view used to explain the state in which the HDD is pulled out of the outer casing; and FIG. 15 is a flowchart to which reference will be made in explaining a method of controlling a plurality of cooling fans according to the present invention.

As shown in FIG. 3, a recorder 20 used as an electronic apparatus includes a main casing 25 composed of a chassis 21 having a substantially U-like cross-section made of a suitable metal such as aluminum, a panel 22 and a back plate 23 disposed on the front side and the back side of the chassis 21 and a cover (not shown in FIG. 3 but shown in FIG. 8) 24 having a substantially U-like cross-section.

The chassis 21 of the recorder 20 has vent holes bored thereon to take air into the recorder 20. The chassis 21 has a ventilator 26a (see FIGS. 3 and 6) and ventilators 26b, 26c (see FIGS. 4 and 5) formed thereon, and a cover 24 also have suitable vent holes bored thereon. A power supply unit 27 is disposed on the left front side of the major surface of the chassis 21, a DVD drive unit 28 is disposed on the central front side of the chassis 21 and a HDD drive unit 29 is disposed on the right front side of the major surface of the chassis 21. A partition plate 30 is disposed at substantially the central position of the chassis 21 so as to become parallel to the panel 22 and the back plate 23. A tuner unit 31 is disposed at the right back side between the partition plate 30 and the back plate 23 on the chassis 21. A computer unit (CPU (central processing unit)) 34 with heat radiation members such as a second cooling fan 35 with a relatively small capacity and a heat sink 33 is disposed at the central back side in the state in which they are inclined in the longitudinal direction of the partition plate 30. A first cooling fan 32 with a relatively large capacity is disposed on the left-hand side of the back plate 23. The panel 22 has at least on its front formed a tray slot 37 of a size large enough to load and unload a tray 36 which can be freely inserted into and ejected from the DVD drive unit 28. Although not shown, various kinds of operation devices are disposed on the front of the panel 22.

As shown in a plan view of FIG. 4 and a perspective view of FIG. 5 showing the chassis 21 with its panel 22 being removed, an open air detection sensor 38 for detecting a temperature of the open air is provided in the vicinity of the ventilator 26c bored on the chassis 21 of the front portion of the HDD drive unit 29. A CPU sensor 39 for controlling a temperature of the CPU 34 is located within the CPU 34. In FIG. 4, reference numerals 40 denote rubber leg members comprising shock absorbing devices.

In the recorder 20 according to this embodiment, as shown in FIG. 5, the open air 42 taken from the above-described respective ventilators 26a, 26b and 26c is absorbed by the second cooling fan 35 through opening holes 41 bored through the partition plate 30 so that the open air 42 is forcedly air-cooled behind the back plate 23 by the first cooling fan 32 while the heat sink 33 of the CPU 34 is being air-cooled.

When the above-mentioned second cooling fan 35 is inclined with a proper inclination angle relative to the opening holes 41 bored through the partition plate 30, the air-cooling effect for air-cooling the heat sink 33 of the CPU 34 can be enhanced. The reason for this will be described with reference to the schematic plan view of FIG. 6. In FIG. 6, elements and parts identical to those of FIG. 5 are denoted by identical reference numerals and therefore need not be described. FIG. 6 is a plan view schematically showing the case in which the ventilation method shown in FIG. 5 is applied to the inside of a substantially flat rectangular solid-like inner metal casing 43 comprising an enclosure of a HDD 45 which will be described later on.

The open air 42 taken into the inner casing 43 from the ventilators 26a, 26d bored through the left and right side walls of the inner casing 43 and the ventilator 26c bored through the front surface of the inner casing 43 is absorbed by the second cooling fan 35 and sent to the heat sink 33 located at the front surface of the second cooling fan 35 with a proper inclination angle. In the case of FIG. 6, the second cooling fan 35 is not fixed to the chassis 21 with a proper inclination angle but the heat sink 33 is inclined with a proper inclination angle relative to the second cooling fan 35, which has a relative relationship with the case of FIG. 5. Thus, it can be considered that the arrangement shown in FIG. 6 is identical to that shown in FIG. 5.

A heat generating device such as the CPU 34 is located under the heat sink 33. The first cooling fan 32 is attached to the back plate 23 of the inner casing 43 to exhaust the heated air from the inner casing 43 through the first cooling fan 32 to the outside after the open air 42 has passed through fins 44 of the heat sink 33 to cool the heat generating device such as the power supply unit 27. As described above, since a cool wind absorbed from the open air 42 sent from the second cooling fan 35 enters into the fins 44 of the heat sink 33 with a proper inclination angle, the fins 44 are cooled by a stronger cooling wind and hence a cooling effect for cooling the heat sink 33 can be enhanced.

The arrangement of the HDD drive unit 29 will be described next with reference to FIGS. 7 and 8. FIG. 8 is a cross-sectional view taken along the line VIII—VIII in FIG. 7. As illustrated, the HDD drive unit 29 is fixed to boss portions 46, formed by chassis contraction, comprising shock-absorbing members on the chassis 21 and a sub-chassis 47 bent in a U-like shape and which is fixed to the left side plate of the chassis 21.

The sub-chassis 47 has a heat-radiation through-hole 48 of substantially dome-like shape for exhausting air formed at substantially the central portion of a substantially rectangular solid-like major surface 47 thereof. Left and right ends of the major surface 47 are bent in the upper and lower direction so as to become perpendicular to each other to form an attachment leg portion 47a and an attachment member 47b. The attachment leg portion 47a is fixed to the chassis 21 through the boss portion 46, formed by chassis contraction, comprising the shock-absorbing member and the attachment member 47b is fixed to the right side surface portion of the chassis 21 which is bent in a U-like shape.

As shown in FIG. 8 which is a cross-sectional view taken along the line VIII—VIII in FIG. 7, the HDD drive unit 29 is composed of a disk drive unit 51 covered with a metal box-like inner casing 50 serving as an enclosure, a pickup head 52, a HDD 45 including input and output shroud groups (see FIG. 7) and the like, a shock-absorbing device (noise absorption material) in which the inner casing 50 of the HDD 45 is surrounded with a foam resin sheet 53 with cushion property such as polyurethane, an elastic rubber and a foam soft synthetic resin to form a shock-absorbing and noise-insulation shock-absorbing device and an outer casing 54 serving as a noise insulation box.

The upper, lower, right and left plates and the back plate of the inner casing 50 of the HDD 45 are wrapped with the foam resin sheet 53 made of polyurethane for use in shock-absorbing and noise insulation and the inner casing 50 of the HDD 45 is further inserted into the noise insulation outer casing 54. A foam heat transmission sheet 55 is disposed on the upper plate (top) of the inner casing 50. More specifically, the foam heat transmission sheet 55 for transmitting heat accumulated within the HDD 45 and which is transmitted to the top of the inner casing 50 is attached to the side of the outer casing 54 so as to be brought in contact with a part of the top of the inner casing 50.

Further, electrically-conductive gaskets 56 made of a suitable material such as a foam metal mesh for preventing the HDD 45 from being broken by static electricity are fixed to the outer casing 54 or they are fixed to the left and right corner portions of the inner casing 50 of the HDD 45, thereby being electrically conducted with the inner casing 50 or the outer casing 54. In FIG. 8, reference numeral 57 denotes a thermoplastic or thermosetting film sheet having a slippery surface, such as a polyethylene or vinyl chloride thin film. A heat radiation sheet 66a for radiating heat transmitted to the outer casing 54 is formed on the outer surface of the top 62 of the outer casing 54. Far-infrared rays radiated from this heat radiation film 66a are radiated into a heat radiation sheet 66b formed on the cover 24 of the recorder 20 located at the position spatially spaced apart from the top 62 of the outer casing 54. In this case, the heat radiation sheet 66a radiates heat of far-infrared rays into the air and heat of the far-infrared rays radiated in the air is strongly absorbed by the same heat radiation heat 66b formed on the cover 24 of the recorder 20. Accordingly, heat raised at high temperature within the HDD 45 is radiated from the cover 24 with the heat radiation sheet 66b attached thereto. Although heat from the inner casing 50 can of course be radiated to the outside by the cover 24 without the heat radiation sheet 66b formed on the side of the cover 24, when the heat radiation sheet 66b is attached to the inner surface of the cover 24, heat radiated from the heat radiation sheet 66a can be efficiently absorbed by the heat radiation sheet 66b and therefore heat radiation effect can be enhanced.

According to the above-mentioned arrangement, in the electronic apparatus in which a signal is recorded and/or reproduced by the hard disk drive and in which heat generated from the hard disk drive is transmitted to the heat transmission unit and introduced into the heat radiation unit and thereby radiated to the outside, the hard disk drive is attached to the fixed portion of the electronic apparatus through an elastic material and the heat radiation unit is attached to the fixed portion of the electronic apparatus without an elastic material. Also, the hard disk drive, the heat radiation unit and the heat transmission unit have far-infrared transmitting and receiving members formed on their surface so that heat is transmitted through two opposing surfaces distant from each other by a predetermined length. Thus, it is customary that the HDD is attached to the fixed portion of a base and the like through an elastic material so that the HDD may be prevented from being directly shocked by vibrations. On the other hand, when the heat radiation unit is directly attached to the base, it is advantageous that heat is transmitted from the heat radiation unit to the base. However, when the heat radiation unit and the HDD are joined by means of a heat transmission member, vibration and shock of the fixed portion are directly transmitted to the HDD. Therefore, according to the arrangement of the present invention, that is, "heat is transmitted through the two opposing surfaces distant from each other by the predetermined length in which the far-infrared ray transmitting and receiving members are disposed", there can be constructed an arrangement in which vibration and shock can be prevented from being transmitted although heat can be transmitted.

A structure of the film sheet 57 for wrapping the inner casing 50 of the above-mentioned HDD 45, a method for attaching the foam resin sheet 53 and a method for mounting (inserting) the inner casing 50 wrapped with the foam resin sheet 53 into the outer casing 54 will be described with reference to FIGS. 9, 10 and 11

Prior to describing the present invention with reference to FIG. 9, the present invention will be described with reference to FIG. 10. FIG. 10 is a perspective view showing an example of the film sheet 57. As shown in FIG. 10, the film sheet 57 made of a thin film synthetic resin such as polyethylene and vinyl chloride and which has a slippery surface is cut in the form of a substantially rectangular solid. An upper sheet 57a which contacts with the top of the HDD 45 is composed of front, back, left and right folding sheet members 57F, 57B, 57L and 57R which are brought in contact with the front, back, left and right plates of the HDD 45 and thereby folded along folding lines 57h. A substantially square-shaped lower sheet 57b, continued from the folding sheet member 57B to contact with the back side of the inner casing 50, has a rectangular radiation opening 57f formed thereon to radiate heat from the HDD 45. At the same time, the lower sheet 57b has a tongue-like pull-out member 57g punched out along the folding line 57h.

The upper sheet 57a has a square electrically conductive through-hole 57e formed at substantially the central position thereof and, a substantially square heat transmission sheet 55 attached to the inner surface of the outer casing 54 is brought in contact with the top of the inner-casing 50 through this electrically-conductive through-hole 57e. Also, the upper sheet 57a has front, back, right and left rectangular ground through-holes 57c, 57d formed on the front, back, right and left portions thereof. Four substantially square electrically-conductive gaskets 56 attached to the inner surface of the outer casing 54 are brought in contact with the top of the inner casing 50 through the ground through-holes 57c, 57d. That is, the film sheet 57 according to the present invention may be cut with substantially a rectangular shape which results from removing fastening margins with cross-section required when an inner box is molded from the original sheet of the film sheet.

A method of attaching the foam resin sheet 53 to the film sheet 57 will be described with reference to FIG. 11. As shown in FIG. 11, the substantially rectangular foam resin sheet 53a is attached to the film sheet 57 from the back side of the lower sheet 57b. The foam resin sheets 53b of similar shape are attached to the left and right folding sheet members 57L, 57R, and further substantially L-like foam resin sheets 53c and which have recesses corresponding to the rectangular ground holes 57c, 57d are attached to the upper sheet 57a. The L-like short side portion of one foam resin sheet 53c is attached to the front sheet folding member 57F and the long side portion thereof is attached to the left side surface of the upper sheet 57a. The L-like short side portion of the other foam resin sheet 53d is attached to the back sheet folding member 57B and the long side portion thereof is attached to the right side surface of the upper sheet 57a.

FIG. 9 is an exploded perspective view used to explain the assembled state presented when the HDD 45 is mounted on the outer casing 54 of the HDD drive unit 29. A method of mounting the HDD 45 wrapped with the wrapping body 59 in which the foam resin sheet 53 is attached to the film sheet 57 from the back side of the outer casing 54 onto the outer casing 54 will be described below. The top 60 of the box-like enclosure comprising the inner casing 50 of the HDD 45 is provided in the lower side in FIG. 9 and the upper side of the top 60 is not provided with a metal bottom plate so that a printed circuit board and the like are made open. The disk drive unit 51, the pickup head 52 and the like are disposed in the inside of the HDD 45 as has been described before in detail with reference to FIG. 8. In FIG. 9, reference numeral 49 denotes input and output connection shroud group of the HDD 45.

The foam resin sheets 53a, 53b, 53c and 53d are attached to the film sheet 57, described with reference to FIG. 10, to thereby form the wrapping body 59. The top 60 of the HDD 45 is mounted on the foam resin sheets 53c and 53d of the upper sheet 57a of the film sheet 57 comprising this wrapping body 59. Left, right, front and back folding members 57L, 57R, 57F and 57B are folded so that they may be erected, respectively. The left, right, front and back side plates of the inner casing 50 of the HDD 45 are wrapped with the elastic foam resin sheets 53b, 53c and 53d which are excellent in shock proof property and noise insulation property and the lower sheet 57b is mounted on the back side of the HDD 45, whereby the back side of the HDD 45 is covered with the foam resin sheet 53a through the film sheet 57.

The HDD 45 wrapped with the wrapping body 59 in this manner is inserted into the outer casing 54. As shown in FIG. 9, the outer casing 54 is substantially a box made of a metal plate such as an aluminum plate. Left and right side plates 54L, 54R and the end portion of the back side plate 54B of the outer casing 54 are bent in the direction perpendicular to the top 62 to thereby form a fixed hole 61 to fix the outer casing 54 to the sub-chassis 47. Also, the front side plate 54F of the outer casing 54 is bent slightly so as to expose the connection shroud group 49 of the HDD 45 to the outside. An elastic heat conductive sheet 55 of a substantially rectangular shape with excellent heat conduction property and of which size is smaller than the rectangular electrically-conductive hole 57e bored on the film sheet 57 is bonded to the central position of the inside of the top 62 of the outer casing 54. A non-silicon-based hyper soft heat radiation material (No. 5505S) manufactured by 3M CORPORATION, for example, can be used as this heat conductive sheet 55. This hyper soft heat radiation material is made of a thin base film on which a heat conductive acrylic elastomer is formed.

The elastic electrically-conductive gaskets 56 of substantially rectangular shape with excellent electrically-conductive property and which are smaller than the rectangular ground holes 57d, 57c bored on the film sheet 57 are bonded to left, right, front and back positions of the inside of the top 62 of the outer casing 54. A soft high seal gasket (SHSG) manufactured by KITAGAWA INDUSTRIES CO., LTD., for example, can be used as this electrically-conductive gasket 56. This SHSG is made of a foam resin with an electrically-conductive mesh mixed thereto and is able to keep electrically-conductive property under relatively low compression force.

An insertion method required when the sub-assembly wrapping body 65 in the sub-assembly state in which the above-mentioned HDD 45 is wrapped with the wrapping body 59 is inserted into the outer casing 54 will be described with reference to FIGS. 12A, 12B and 12C. FIG. 12B is a cross-sectional side view showing the state in which the sub-assembly wrapping body 65 is cut along the direction perpendicular to the long side of the outer casing 54. A short side inside dimension L2, a long side inside dimension (not shown) and an inside height H2 of the outer casing 54 are smaller than a short side outer dimension L1, a long side outer dimension (not shown) and an outside height H1 of the sub-assembly wrapping body 65. The reason for this is that the volume of the sub-assembly wrapping body 65 is increased by the amount corresponding to the thicknesses produced when the foam resin sheets 53a, 53b, 53c and 53d attached to the film sheet 57 can be contracted.

The heat radiation sheet 66a is attached to the surface of the top 62 of the outer casing 54 as has been described before with reference to FIG. 8. FIG. 12C is a schematic diagram showing a portion D in FIG. 12B in an enlarged-scale. As shown in FIG. 12C, a far-infrared ray transmitting and receiving member made of ceramic for radiating or absorbing far-infrared rays, for example, manufactured by OKI ELECTRIC INDUSTRY COMPANY LIMITED under the trade name of "MAZUHARU ICHIBAN" can be used as this heat radiation sheet 66a formed on a bonding sheet 67 comprising the bonding layer. Although a hard type far-infrared ray transmitting and receiving member in which ceramic is coated on a base such as aluminum or a far-infrared ray transmitting and receiving member using a flexible film as a base thereof is commercially available on the market, the present invention is not limited thereto and a far-infrared ray transmitting and receiving material such as ceramic may be directly coated on the outer surface of the top 62 of the outer casing 54 or the inner surface of the cover 24. Also, the outer casing 54 may be processed as a box from a metal material such as aluminum coated with the far-infrared ray transmitting and receiving member.

Accordingly, when the sub-assembly wrapping body 65 is pushed into the outer casing 54 with pressure as shown by an open arrow C in FIG. 12B, the foam resin sheets 53b, 53c and 53d attached to the film sheet 57 are crushed and the surface of the film sheet 57 is slippery so that the sub-assembly wrapping body 65 can be smoothly inserted into the outer casing 54.

The sub-assembly wrapping body 65 incorporating therein the HDD 45 inserted into the outer casing 54 can be strongly held within the outer casing 54 by the swollen (expanded) foam resin sheets 53b, 53c and 53d. A method of removing the sub-assembly wrapping body 65 inserted into the outer casing 54 as described above from the outer casing 54 with ease will be described with reference to FIGS. 13A, 13B and FIG. 14.

In FIGS. 13A, 13B and FIG. 14, FIGS. 13A and 13B are perspective views showing, in a partly cross-sectional fashion, the state in which the sub-assembly wrapping body 65 is inserted into the outer casing 54, and FIG. 14 is a cross-sectional side view showing the state in which the sub-assembly wrapping body 65 is pulled out of the outer casing 54. When the sub-assembly wrapping body 65 incorporating therein the HDD 45 loaded into the outer casing 54 is pulled out of the outer casing 54, since the tongue-like pull-out member 57g formed on the film sheet 57 lies on the side of the back plate 54B of the outer casing 54 as shown in FIG. 13A, a user raises this tongue-like pull-out member 57g with fingers as shown in FIG. 13B and lifts the pull-out member 57g as shown by an open arrow E in FIG. 14, whereby the foam resin sheets 53b, 53c and 53d attached to the wrapping body 59 are lifted while they are contracted by the front plate 54F and the left and right plates 54L, 54R. As a result, the user is able to pull out the sub-assembly wrapping body 65 from the outer casing 54 with ease.

The sub-assembly wrapping body 65 incorporating therein the HDD 45 as described above can be easily inserted or removed from the outer casing 54 by using slippage on the slippery surface of the film sheet 57. While the top 62 of the sub-assembly wrapping body 65 is being directed upwards, the sub-assembly wrapping body 65 is fixed to the sub-chassis 47 through the foam resin sheet 53a by suitable means such as screws as shown in FIG. 8. Accordingly, as shown in FIG. 8, the sub-assembly wrapping body 65 becomes able to use the foam resin sheet 53a as the shock-absorbing member relative to the sub-chassis 47 so that the HDD 45 can be insulated from vibrations of the sub-chassis 47.

Next, a method of controlling the first and second cooling fans 32 and 35 provided within the chassis 21 of the recorder 20 shown in FIGS. 5 and 6 will be described with reference to a flowchart of FIG. 15. The CPU 34 shown in FIG. 5 executes control operations shown in the flowchart of FIG. 15. The two first and second cooling fans 32 and 35 are able to rotate at high speed (hereinafter simply referred to an "H rotation mode") and at low speed (hereinafter referred to as an "L rotation mode") selectively.

Referring to FIG. 15 in detail, and when a power switch is turned on, the CPU 34 starts controlling the two cooling fans 32 and 35. Then, control goes to a first step ST1, whereat the power switches of the first and second cooling fans 32 and 35 are turned off by stop setting. In the first step ST1, the first and second cooling fans 32 and 35 are placed in the stop mode during a predetermined time period of T0 (minute), for example, 5 minutes in order to dump a noise, since the power switch has been turned on.

Then, control goes to the next second decision step ST2, whereat it is determined by the CPU 34 whether or not a temperature detected by the open air detection sensor 38 is higher than a predetermined temperature T1° C. (for example, 55° C.) If the temperature detected by the open air detection sensor 38 is higher than the predetermined temperature T1° C., then it is determined that the open air detection sensor 38 is de-energized. Thus, if the detected temperature is higher than the predetermined temperature T1° C. as represented by a YES at the second decision step ST2, then control goes to a 14th step ST14, whereat the CPU 34 executes emergency processing to de-energize the recorder 20. In the emergency processing at the 14th step ST14, the power switch of the power supply unit 27 is turned off and the power switch can be prevented from being turned off even when the power supply unit 27 is again energized so long as the emergency processing is not canceled. If the temperature detected by the open air detection sensor 38 is lower than the predetermined temperature T1° C. as represented by a NO at the second decision step ST2, then control goes to a third decision step ST3.

It is determined by the CPU 34 at the third detection step ST3 whether or not a temperature detected by the open air detection sensor 38 is higher than a predetermined temperature T2° C. (for example, 35° C.). If the temperature detected by the open air detection sensor 38 is higher than the predetermined temperature T2° C. as represented by a YES at the third detection step ST3, then control goes to a tenth step ST10, whereat the CPU 34 executes high speed rotation setting processing to allow the first and second cooling fans 32 and 35 to rotate at high speed (H rotation mode). If the detected temperature is not higher than the predetermined temperature T2° C. as represented by a NO at the third decision step ST3, then the two cooling fans 32 and 35 are de-energized respectively. More specifically, if the temperature detected by the open air detection sensor 38 is not higher than the predetermined temperature T2° C. as represented by a NO at the third decision step ST3, then control goes to a fourth decision step ST4. In the fourth decision step ST4, it is determined by the CPU 34 whether or not a temperature detected by the CPU sensor 39 added to the CPU 34 is higher than a predetermined temperature T3° C. (for example, 60° C.). If the temperature detected by the CPU sensor 39 is higher than the predetermined temperature T3° C. as represented by a YES at the fourth decision step ST4, then control goes to the tenth step ST10, whereat the CPU 34 executes high speed rotation setting processing to allow the first and second cooling fans 32 and 35 to rotate at high speed (H rotation mode). If on the other hand the detected temperature is not higher than the predetermined temperature T3° C. as represented by a NO at the decision step ST4, then control goes to a fifth decision step ST5.

It is determined at the fifth decision step ST5 by the CPU 34 whether or not the predetermined time T0 (for example, 5 minutes) passed. If the predetermined time T0 does not pass as represented by a NO at the fifth decision step ST5, then control goes back to the second decision step ST2. If the predetermined time T0 passed as represented by a YES at the fifth decision step ST5, then control goes to a sixth step ST6.

In the sixth step ST6, the CPU 34 sets the first and second cooling fans 32 and 35 to the L rotation state, respectively so that the first and second cooling fans 32 and 35 can be rotated at low speed.

Then, control goes to a seventh decision step ST7, whereat it is determined by the CPU 34 whether or not a temperature detected by the open air detection sensor 38 is higher than the predetermined temperature T1° C. If the temperature is higher than the predetermined temperature T1° C. as represented by a YES at the decision step ST7, then the open air detection sensor 38 is de-energized and control goes to the 14th step ST14, whereat the CPU 34 executes the emergency processing to turn off the power supply. If the detected temperature is not higher than the predetermined temperature T1° C. as represented by a NO at the seventh decision step ST7, then control goes to the next eighth step ST8.

It is determined at the eighth decision step ST8 by the CPU 34 whether or not a temperature detected by the open air detection sensor 38 is higher than the predetermined temperature T2° C. If the detected temperature is higher than the predetermined temperature T2° C. as represented by a YES at the eighth decision step ST8, then control goes to the tenth step ST10, whereat the first and second cooling fans 32 and 35 are switched to the H rotation state, that is, the first and second cooling fans 32 and 35 can rotate at high speed. If on the other hand the detected temperature is not higher than the predetermined temperature T2° C. as represented by NO at the eighth decision step ST8, then control goes to the next ninth decision step ST9. It is determined at the ninth decision step ST9 by the CPU 34 whether or not a temperature detected by the CPU sensor 39 is higher than the predetermined temperature T3° C. If the detected temperature is higher than the predetermined temperature T3° C. as represented by a YES at the ninth decision step ST9, then control goes to the tenth step ST10, whereat the first and second cooling fans 32 and 35 are switched to the H rotation mode, that is, the first and second cooling fans 32 and 35 can rotate at high speed. If on the other hand the detected temperature is not higher than the predetermined temperature T3° C., then control goes back to the seventh step ST7, and the seventh decision step ST7 to the ninth decision step ST9 are repeated.

In the tenth step ST10, the first and second cooling fans 32 and 35 are rotated at high speed in the H rotation mode as described above. Control goes to the next eleventh decision step ST11, whereat it is determined by the CPU 34 whether or not a temperature detected by the open air detection sensor 38 is higher than the predetermined temperature T1° C. If the detected temperature is higher than the predetermined temperature T1° C. as represented by a YES at the 11th decision step ST11, then the open air detection sensor 38 is de-energized and control goes to the 14th step ST14, whereat the CPU 34 executes the emergency processing to de-energize the power supply. If the detected temperature is not higher than the predetermined temperature T1° C. as represented by a NO at the 11th decision step ST11, then control goes to the next 12th decision step ST12. It is determined at the 12th decision step ST12 by the CPU 34 whether or not a temperature detected by the open air detection sensor 38 is higher than a predetermined temperature T4° C. (for example, 32° C.).

If the detected temperature is higher than the predetermined temperature T4° C. as represented by a YES at the 12th decision step ST12, then control goes back to the sixth step ST6, whereat the first and second cooling fans 32 and 35 are rotated at low speed (L rotation mode). If on the other hand the detected temperature is not higher than the predetermined temperature T4° C. as represented by a NO at the 12th decision step ST12, then control goes to the next 13th decision step ST13. It is determined at the 13th decision step ST13 by the CPU 34 whether or not a temperature detected by the CPU sensor 39 is lower than a predetermined temperature T5° C. If the detected temperature is higher than the predetermined temperature T5° C. as represented by a NO at the 13th decision step ST13, then control goes back to the 11th decision step ST11 and the 11th decision step ST11 to the 13th decision step ST13 are repeated. If the detected temperature is lower than the predetermined temperature T5° C. as represented by a YES at the 13th decision step ST13, then control goes back to the sixth step ST6, whereat the first and second cooling fans 32 and 35 are both rotated at low speed (L rotation mode).

Specifically, according to the present invention, when the power supply is set to the initial state, the two first and second cooling fans 32 and 35 are placed in the de-energized state for about 5 minutes. If the temperature detected by the open air detection sensor 38 is lower than the predetermined temperature T1° C., then the first and second cooling fans 32 and 35 are placed in the de-energized state. If on the other hand the above temperature detected by the open air detection sensor 38 is higher than the predetermined temperature T1° C., then the first and second cooling fans 32 and 35 are rotated at high speed (H rotation mode). If the temperature detected by the open air detection sensor 38 is lower than the predetermined temperature T1° C. and a predetermined time T0 (5 minutes) passed, then the first and second cooling fans 32 and 35 are rotated at low speed (L rotation mode). If the temperature detected by the open air detection sensor 38 becomes higher than the predetermined temperature T2° C. and the open air detection sensor 38 is de-energized, then control of the CPU 34 goes to the emergency processing to de-energize the power supply. If the temperature detected by the CPU sensor 39 becomes higher than the predetermined temperature T3° C., then the first and second cooling fans 32 and 35 are rotated at high speed (H rotation mode).

Also, if the temperature detected by the open air detection sensor 38 becomes higher than the predetermined temperature T1° C. during the first and second cooling fans 32 and 35 are being rotated at low speed (L rotation mode), then the first and second cooling fans 32 and 35 are rotated at high speed (H rotation mode). If the temperature detected by the open air detection sensor 38 becomes the predetermined temperature T2° C. and the open air detection sensor 38 is de-energized, then control of the CPU 34 goes to the emergency processing to de-energize the power supply. If the temperature detected by the CPU sensor 39 becomes higher than the predetermined temperature T3° C., then the first and second cooling fans 32 and 35 are rotated at high speed (H rotation mode).

Further, if the temperature detected by the open air detection sensor 38 becomes lower than the predetermined temperature T4° C. during the first and second cooling fans 32 and 35 are being rotated at high speed (H rotation mode). If on the other hand the temperature detected by the open air detection sensor 38 becomes higher than the predetermined temperature T1° C. and the open air detection sensor 38 is de-energized, then control of the CPU 34 goes to the emergency processing to de-energize the power supply. If the temperature detected by the CPU sensor 39 becomes lower than the predetermined temperature T5° C., then the first and second cooling fans 32 and 35 are rotated at low speed (L rotation mode).

A first embodiment according to the present invention will be described below.

Figure 16A:
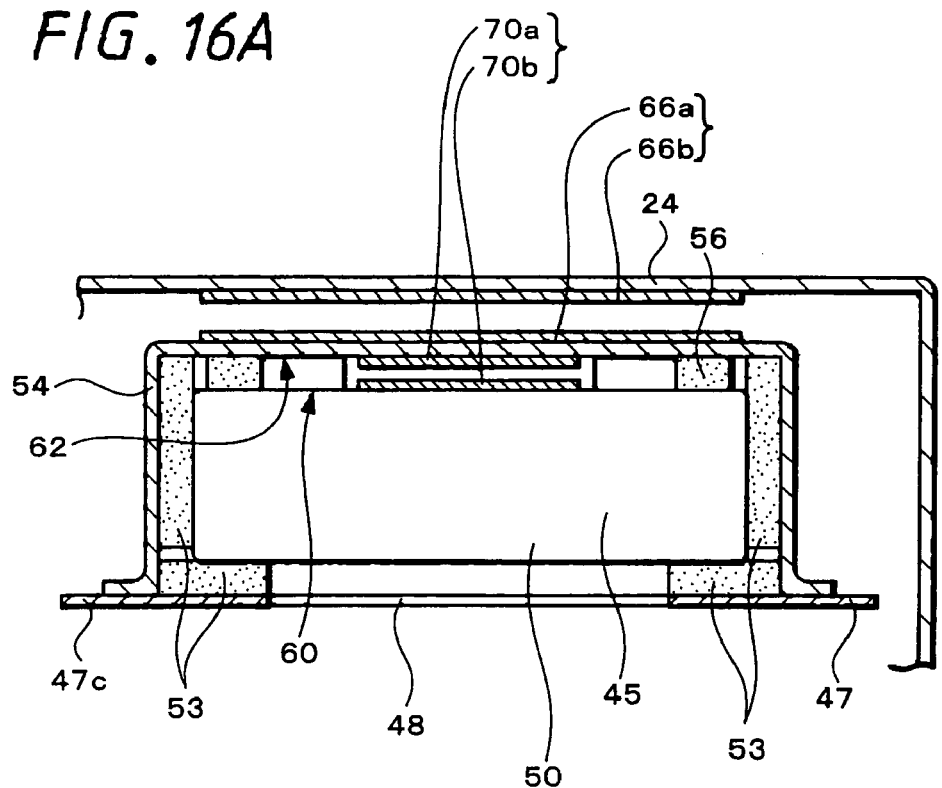
FIGS. 16A and 16B are respectively cross-sectional side views similar to FIG. 8 and illustrate a main portion of another embodiment of the present invention and to which reference will be made in explaining a method for radiating heat from the HDD according to the present invention.
Figure 16B:
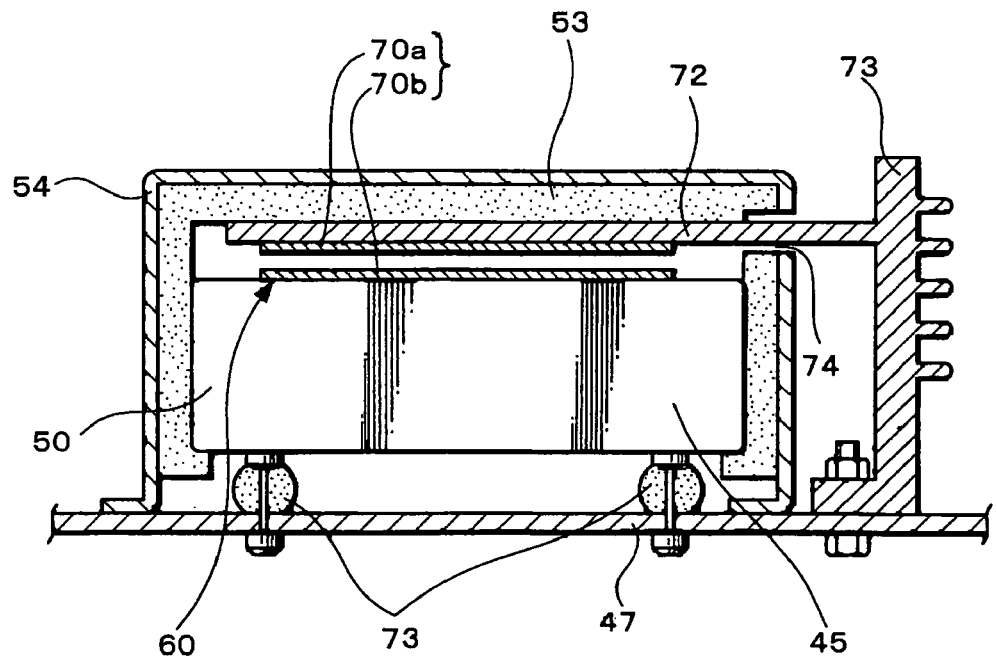

In the sub-assembly wrapping body 65 that has been described so far with reference to FIG. 8, heat accumulated in the inner casing 50 of the HDD 45 is transmitted to the outer casing 54 through the heat conductive sheet 55. As shown in FIG. 16A, the far-infrared ray transmitting and receiving members composed of the heat radiation sheets 70a, 70b having arrangements similar to those of the heat radiation sheets 66a, 66b (see FIG. 8) are located at the opposing distant positions of the top 60 of the inner casing 50 of the HDD 45 and the top 62 of the outer casing 54 to thereby transmit accumulated heat from the top 60 of the inner casing 50 of the HDD 45 to the heat radiation sheet 70b. Radiated heat is absorbed by the heat radiation sheet 70a disposed on the inner surface of the top 62 of the outer casing 54, and heat radiated to the outer casing 54 is radiated from the cover 24 through the far-infrared ray transmitting and receiving member composed of the heat radiation sheet 66b and the heat radiation sheet 66a disposed on the cover 24. In FIG. 16A and 16B, elements and parts identical to those of FIG. 8 are denoted by identical reference numerals and therefore need not be described.

FIG. 16B shows a further arrangement of the present invention. As shown in FIG. 16B, the heat radiation sheets 70a, 70b similar to those of FIGS. 8 and 14A are used to radiate heat accumulated in the HDD 45 to the heat sink 73 provided on the sub-chassis 47.

As shown in FIG. 16B, the HDD 45 has the vibration isolating structure relative to the sub-chassis 47 by the shock absorbing device such as the rubber leg portions 73, and the inner wall of the outer casing 45 is covered with the foam resin sheet 53 to thereby dump a noise and to isolate a noise. A metal heat transmission plate 72 of a substantially square shape is located at the position at which it is distant from the ceramic heat radiation plate 70b formed on the top 60 of the HDD 45 in an opposing fashion. The heat radiation sheet 70a is attached to the heat transmission plate 72 at its position in which it is opposed to the heat radiation sheet 70b. One end of the heat transmission plate 72 is fixed to the opposite side of the fins of the heat sink 71 and it is projected from the through-hole 74 bored on the outer casing 54. Accordingly, heat from the HDD 45 is radiated from the heat radiation sheet 70b to the space, it is absorbed by the heat radiation sheet 70a of the heat transmission plate 72, it is transmitted to the heat transmission plate 72 and it is further radiated through the heat transmission plate 72 from the heat sink 71 to the air.

According to the HDD 45 having the arrangement shown in FIGS. 16A and 16B, since accumulated heat from the HDD 45 or the outer casing 54 is completely isolated from the cover 24 serving as the heat radiation body and the heat sink 71, even when shocks and vibrations are applied to these heat radiation bodies, shocks and vibrations can be prevented from being transmitted to the HDD 45 and hence the HDD 45 can become more reliable.

Figure 17:
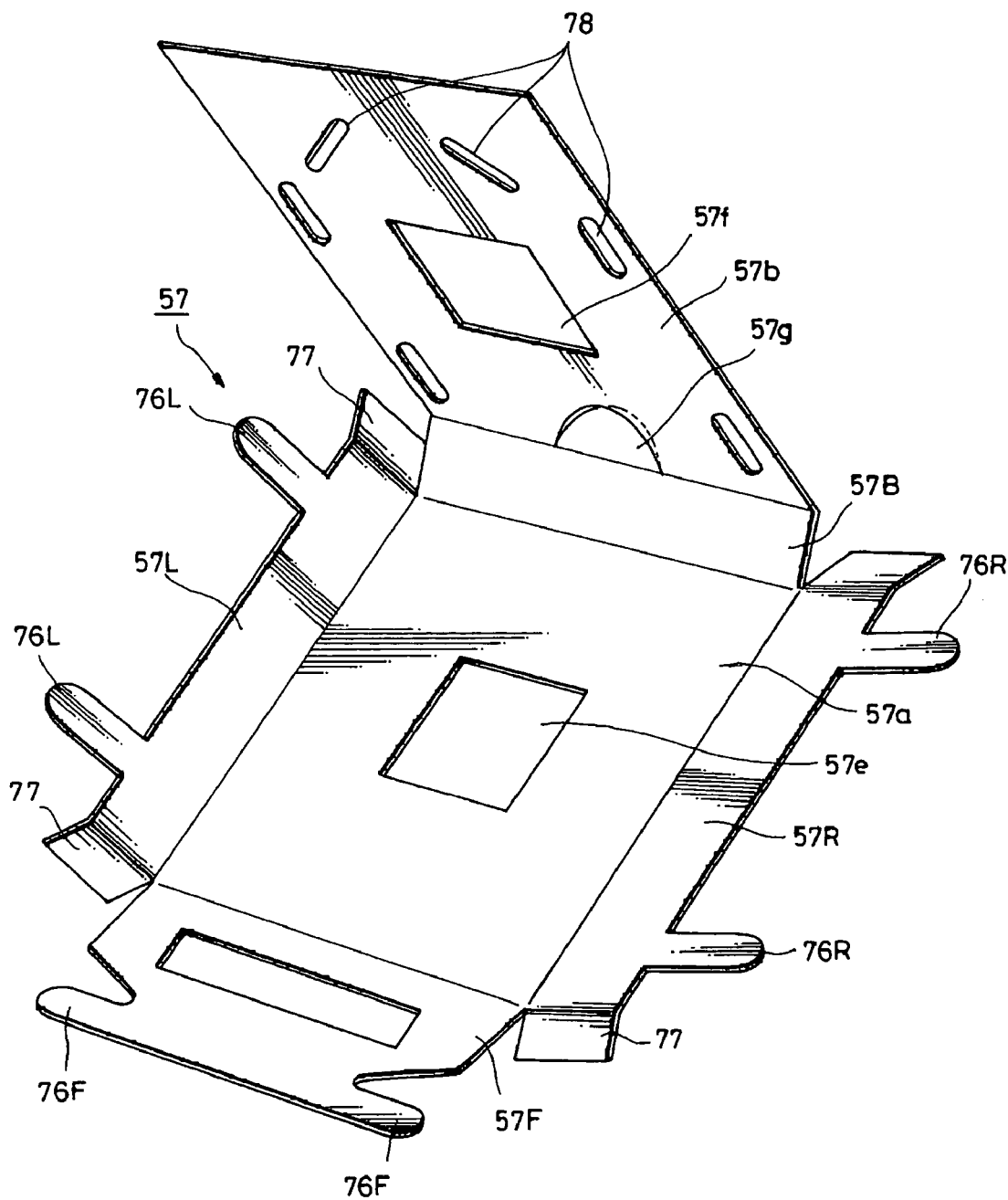
FIG. 17 is a perspective view similar to FIG. 10 and shows a film sheet for use with the recorder according to another embodiment of the present invention.

An example of other arrangement of the film sheet 57 that has been described so far with reference to FIG. 10 will be described with reference to FIG. 17. In FIG. 17, elements and parts identical to those of FIG. 10 are denoted by identical reference numerals and therefore need not be described. In the arrangement shown in FIG. 17, dome-like tongue portions 76L, 76R, 76F and square folding members 77 serving as the fastening margins of the front and back folding sheet members 57F, 57B are formed on the left folding sheet member 57L, the right folding sheet member 57R and the front folding sheet member 57F. Upon assembly, the tongue portions 76L, 76R, 76F are inserted into groove holes 78 formed on the lower sheet 57b, and in the state in which the wrapping body 59 or the sub-assembly wrapping body 65 is assembled, the film sheet 57 can be formed as an inner box type. According to this arrangement, the sub-assembly wrapping body 65 can be mounted on the outer casing 54 more easily.

While the recorder including the HDD or the DVD has been described so far as the above-described electronic apparatus, the present invention is not limited thereto and the present invention can be applied to various kinds of drive apparatuses and electronic apparatuses, which generate heat, such as a disk recording and reproducing apparatus for recording and reproducing disks such as a CD (compact disc) and a CD-ROM (CD-read only memory) and recording and reproducing apparatus using a tape as a recording medium such as a VTR (video tape recorder) and a tape recorder.

While the sub-assembly wrapping body in which the inner casing serving as the enclosure of the HDD for use with the HDD drive unit is wrapped by the wrapping body made of the film sheet with the noise absorption member attached thereon is inserted into the outer casing serving as the noise insulation box in the above-mentioned respective embodiments, the DVD drive unit, a CD drive unit, a CD-ROM drive unit, a disk recording and reproducing drive unit, a VTR drive unit, a tape recorder drive unit and the like may be incorporated into the inner casings and the sub-assembly wrapping body in which these inner casings are wrapped with the wrapping body made of the film sheet with the noise absorption member attached thereon may be inserted into the outer casing serving as the noise insulation box.

Further, according to the above-mentioned HDD and electronic apparatus of the present invention, since the HDD is wrapped with the wrapping body made of the film sheet with the noise insulation member or the noise absorption member attached thereto and inserted into the noise insulation box (outer casing), there can be obtained the HDD and the electronic apparatus in which the wrapping body can be easily inserted into the noise insulation box owing to slippage of the film sheet and in which, since the film sheet has the pull-out member formed thereon, the wrapping body can be easily pulled out of the noise insulation box by pulling out this pull-out member.

Furthermore, according to the HDD and the electronic apparatus of the present invention, since the HDD is wrapped with the wrapping body formed of the film sheet with the noise insulation member and the noise absorption member attached thereto, there can be obtained the HDD and the electronic apparatus in which heat generated from the HDD can be radiated efficiently, in which seek noise generated when the pickup head within the HDD frequently seeks a target track can be decreased by the film sheet, the noise insulation member and the noise absorption member and in which reliability of hard disk function can be maintained.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:
1. A hard disk drive housing apparatus comprising:
   a hard disk drive housing formed of a substantially square inner casing for housing therein a hard disk drive;
   a thin film sheet of a size large enough to wrap said substantially square inner casing of said hard disk drive housing;
   a wrapping body in which one of a noise insulation member and a noise absorption member is attached to said thin film sheet; and
   an outer casing formed in a substantially box-like shape into which said hard disk drive housing wrapped with said wrapping body is inserted, wherein said thin film sheet surface comes in contact with an inner surface of said box-shaped outer casing in a state in which said hard disk drive housing device is wrapped with said wrapping body.

2. The hard disk drive housing apparatus according to claim 1, wherein one of said noise insulation member and said noise absorption member is a foam resin sheet with a cushion property.

3. The had disk drive housing apparatus according to claim 1 or 2, wherein said thin film sheet is in an expanded shape required when an inner box is molded and said thin film sheet has through-holes formed thereon to project a heat conductive sheet.

4. The hard disk drive housing apparatus according to claim 1 or 2, wherein said thin film sheet has through-holes formed thereon to project electrically-conductive gaskets.

5. The hard disk drive housing apparatus according to claim 1 or 2, wherein said thin film sheet has a pull-out member for pulling out said hard disk drive housing device wrapped with said wrapping body from said outer casing.

6. The hard disk drive housing apparatus according to claim 1, wherein said outer casing has one of a heat conductive sheet and electrically-conductive gaskets formed on the inner surface thereof in advance.

7. An electronic apparatus including a hard disk drive housing formed of a substantially square inner casing incorporating therein a hard disk drive, comprising:

a thin film sheet with a size large enough to wrap said substantially square inner casing of said hard disk drive housing;

a wrapping body in which a noise insulation member for noise absorption is attached to said thin film sheet;

an outer casing having a substantially box shape for mounting thereon said hard disk drive housing wrapped with said wrapping body;

a chassis for holding said outer casing with a shock-absorbing member, wherein noise generated from said hard disk drive incorporated into said inner casing of said hard disk drive housing is insulated by mounting said hard disk drive housing on said electronic apparatus in such a manner that said thin film sheet surface is brought in contact with an inner surface of said outer casing in a state in which said hard disk drive housing is wrapped with said wrapping body.

* * * * *

UNITED STATES PATENT AND TRADEMARK OFFICE
CERTIFICATE OF CORRECTION

| | |
|---|---|
| PATENT NO. | : 7,167,360 B2 |
| APPLICATION NO. | : 11/039236 |
| DATED | : January 23, 2007 |
| INVENTOR(S) | : Kenichi Inoue, Hitoshi Suzuki and Kohtaroh Higuchi |

Page 1 of 1

It is certified that error appears in the above-identified patent and that said Letters Patent is hereby corrected as shown below:

In the Abstract, Line 9, delete the first occurrence of "a";

In Column 17, Line 9, "had" should read --hard--.

Signed and Sealed this

Fourth Day of December, 2007

JON W. DUDAS
*Director of the United States Patent and Trademark Office*